US008806520B2

(12) United States Patent
Sharif-Ahmadi et al.

(10) Patent No.: US 8,806,520 B2
(45) Date of Patent: Aug. 12, 2014

(54) METHOD OF COLLECTING USAGE INFORMATION

(75) Inventors: Seyed Sharif-Ahmadi, West Vancouver (CA); Fay Arjomandi, West Vancouver (CA)

(73) Assignee: Mimik Technology Inc., Vancouver, BC (CA)

( * ) Notice: Subject to any disclaimer, the term of this patent is extended or adjusted under 35 U.S.C. 154(b) by 57 days.

(21) Appl. No.: 13/466,864

(22) Filed: May 8, 2012

(65) Prior Publication Data

US 2013/0125157 A1 May 16, 2013

Related U.S. Application Data

(63) Continuation of application No. 13/498,295, filed as application No. PCT/CA2010/001536 on Sep. 28, 2010.

(60) Provisional application No. 61/246,290, filed on Sep. 28, 2009, provisional application No. 61/314,729, filed on Mar. 17, 2010.

(51) Int. Cl.
*H04N 7/173* (2011.01)
(52) U.S. Cl.
USPC .................. 725/14; 725/9; 725/88; 725/109; 725/114
(58) Field of Classification Search
CPC .................. H04N 21/44213; H04N 21/44222; H04N 21/445
USPC ....................................... 725/9–16
See application file for complete search history.

(56) References Cited

U.S. PATENT DOCUMENTS

| 4,139,860 | A | 2/1979 | Micie et al. |
| 6,516,350 | B1 | 2/2003 | Lumelsky et al. |
| 6,769,127 | B1 | 7/2004 | Bonomi et al. |
| 6,804,824 | B1 | 10/2004 | Potrebic et al. |
| 6,927,806 | B2 | 8/2005 | Chan |
| 6,983,370 | B2 | 1/2006 | Eaton et al. |
| 7,344,084 | B2 | 3/2008 | DaCosta |
| 7,555,767 | B2 | 6/2009 | Takagi et al. |
| 7,558,870 | B2 | 7/2009 | Parker |
| 7,559,079 | B2 | 7/2009 | Kim |
| 7,565,546 | B2 | 7/2009 | Candelore |
| 7,590,997 | B2 | 9/2009 | Diaz Perez |
| 7,987,490 | B2 | 7/2011 | Ansari et al. |
| 8,027,335 | B2 | 9/2011 | Ansari et al. |
| 8,031,726 | B2 | 10/2011 | Ansari et al. |
| 8,078,688 | B2 | 12/2011 | Ansari et al. |
| 8,086,495 | B2 | 12/2011 | Ansari et al. |
| 2002/0056087 | A1* | 5/2002 | Berezowski et al. ............. 725/9 |
| 2002/0059094 | A1* | 5/2002 | Hosea et al. .................... 705/10 |

(Continued)

*Primary Examiner* — Benjamin R Bruckart
*Assistant Examiner* — Akshay Doshi
(74) *Attorney, Agent, or Firm* — LeClairRyan, a Professional Corporation

(57) ABSTRACT

A method and system for micro-cloud computing is described. An application serving node, which is a specifically configured piece of customer premises equipment such as a set-top box, is the server for a micro-cloud network. Various user devices that form part of the micro-cloud network, such as television sets and smart phones, communicate with the application serving node. The application serving node is configured with software that allows various heterogeneous types of data to be obtained and streamed to the user devices in multiple ways. The application serving node performs much of the processing necessary for such content streaming itself and thus represents an edge-based network architecture.

8 Claims, 29 Drawing Sheets

(56) References Cited

U.S. PATENT DOCUMENTS

| | | |
|---|---|---|
| 2003/0133049 A1 | 7/2003 | Cowley et al. |
| 2005/0229118 A1 | 10/2005 | Chiu et al. |
| 2006/0251115 A1 | 11/2006 | Haque et al. |
| 2007/0094691 A1 | 4/2007 | Gazdzinski |
| 2007/0157247 A1* | 7/2007 | Cordray et al. ............... 725/47 |
| 2007/0271587 A1 | 11/2007 | Rowe |
| 2008/0037656 A1 | 2/2008 | Hannuksela |
| 2008/0098446 A1* | 4/2008 | Seckin et al. ............... 725/114 |
| 2008/0106600 A1 | 5/2008 | Benco et al. |
| 2008/0288375 A1 | 11/2008 | Uhrig et al. |
| 2009/0083813 A1 | 3/2009 | Dolce et al. |
| 2009/0089294 A1 | 4/2009 | Davis et al. |
| 2009/0133079 A1 | 5/2009 | Li et al. |
| 2009/0172181 A1 | 7/2009 | Cheng et al. |
| 2009/0177793 A1 | 7/2009 | Josa et al. |
| 2009/0182886 A1 | 7/2009 | McCartie et al. |
| 2009/0183205 A1 | 7/2009 | McCartie et al. |
| 2009/0187939 A1 | 7/2009 | Lajoie |
| 2009/0199238 A1* | 8/2009 | Kummer ..................... 725/39 |
| 2009/0204964 A1 | 8/2009 | Foley et al. |
| 2009/0210907 A1 | 8/2009 | Fox et al. |
| 2009/0210912 A1 | 8/2009 | Cholas et al. |
| 2009/0215436 A1 | 8/2009 | Howard et al. |
| 2009/0219810 A1 | 9/2009 | Polette et al. |
| 2009/0221293 A1 | 9/2009 | Petrovic et al. |
| 2009/0222504 A1 | 9/2009 | Vandanapu |
| 2009/0222851 A1 | 9/2009 | Talmi |
| 2009/0222921 A1 | 9/2009 | Mukhopadhyay et al. |
| 2009/0234972 A1 | 9/2009 | Raghu et al. |
| 2009/0237326 A1 | 9/2009 | Takahashi et al. |
| 2009/0276771 A1 | 11/2009 | Nickolov et al. |
| 2010/0146607 A1* | 6/2010 | Piepenbrink et al. ............ 726/7 |

* cited by examiner (Prior Art)

User Characterization Tree

FIG. 10

Video In → Encoder (format 1) → Decoder (format 1) 262 → Encoder (format 2) 264 → User device decoder

METHOD OF COLLECTING USAGE INFORMATION

RELATED APPLICATIONS

This application is a continuation of co-pending U.S. patent application Ser. No. 13/498,295 filed Mar. 26, 2012 which is a U.S. National Phase application based off of PCT International Application No. PCT/CA2010/001536 having an International Filing Date of Sep. 28, 2010 and entitled, "System and Method for Micro-Cloud Computing", which claims the benefit of priority to U.S. Provisional Patent Application No. 61/246,290, filed on Sep. 26, 2009, and U.S. Provisional Patent Application No. 61/314,729, filed on Mar. 17, 2010, all of which are commonly owned herewith.

TECHNICAL FIELD

The present disclosure is directed at a system and method for micro-cloud computing. More particularly, the present disclosure is directed at a system and method for micro-cloud computing that facilitate content distribution to consumer devices across broadband networks.

BACKGROUND

The growth in data transmitted over wireless and cable networks has been driving consolidation of broadband operators, and creating a highly competitive global broadband service provision market. "Broadband operator" means an operator of a high-speed network that offers data transfer services over one or more types of networks (e.g.: mobile networks and other wireless networks, wired networks, or a combination of the preceding). "Broadband service" includes content delivered over a network; the network may be wired, wireless, cable, DSL, or other digital communication systems, or any combination thereof.

Telephone, cable, satellite, and mobile network operators (collectively, "operators") are evolving and becoming broadband service providers. Triple or quad operators means operators that provide three or four services, such as residential Internet service, residential phone service, residential television, and mobile data services, which may in turn, include voice, Internet, and television. Data usage over both wireless, DSL and cable networks around the world is growing. Operators may grow revenue by offering users a variety of services, and by reducing the cost of their network operation centers ("NOCs") and cost of their data links. Today, operators are offering more services and applications, meaning managing larger NOCs, which in turn translates to higher operating costs for the operators and therefore lower average revenue per user ("ARPU"). Operators are looking for solutions that allow them to run smaller NOCs, offer services suited to users' profiles and the type of device that the user is using at the time (e.g.: television ("TV"), laptop computer, desktop computer, or smartphone).

Today, operators can often identify users are but it is difficult to know what type of content users want based on their context. "Context" includes information about the nature of the user and content, including: information that refers to the user's location; the type of device the user is using to access the network; the level of connectivity access the user has; the user state, which includes information such as whether the user is connected to the network using a mobile or wired connection; whether the user is accessing the network from home or while traveling (e.g.: on vacation or on a business trip); to which networks the user is connected; and the user's interests. User demand for accessing media-rich content in real time is growing; concurrently, the types of devices that used to view such media-rich content is also growing. Broadband networks resulted from the migration of multiple networks, each having different characteristics and operating as silo networks where devices, applications, and networks are tightly coupled. Typical broadband networks are designed based on the assumption that edge devices, such as user devices used to access content, are dumb terminals with little ability to run rich multimedia applications. Typical broadband networks were also designed under the assumption that traffic growth will remain linear, which has been an underestimate.

Conventional solutions to satisfying user demands for delivery of rich multimedia content in real-time has centered on a "core-centric" approach in which a centralized server resides within a NOC for each different type of network; an exemplary "core-centric" network 100 is depicted in FIG. 1. This means that if an operator is operating broadband networks to deliver TV content, residential Internet content and cellular phone content, then such operators would use three different NOCs, TV NOC 250, Internet NOC 350 and cellular NOC 450, respectively. In such a model an operator uses software and servers that offer functionality such as determining the automatic bit rate ("ABR"), providing content inspections, and providing personalization engines that are installed within each NOC. Challenges arise when employing these approaches when serving large numbers, e.g. millions of users; shortcomings associated with these approaches include scalability issues, accuracy issues and synchronization of collected information. As depicted in FIG. 1 a triple and quad player operator is managing multiple NOC 250, 350 and 450, and within each NOC is run the same set of services including video transcoding and transrating engines, content reformatting, caching and proxy services.

Three changes are simultaneously occurring with respect to broadband networks. The first relates to digital content. The amount of content available on the Internet is overwhelming for end users, even very technically savvy ones, and the amount of content is still growing exponentially. Market research reports indicate that the marketplace of digital content is expected to grow to $130 billion worldwide by 2011. This includes on-demand digital video streaming, television services such as video on demand ("VoD"), subscription video on demand ("SVoD") and pay-per-view ("PPV"). Also included in this market is on-line video advertising, Internet protocol television ("IPTV") and mobile TV. References to "television" or "TV" herein shall refer to any of the above listed streaming video services.

The second relates to the effect of a new generation of users and their needs. These new users (often referred to as "Millennials", represent the most populous generation that has ever lived on this planet. They tend to be technology-centric, and both dependent on and aware of technology. On average, each spends over $100 per week on technology-oriented products and services and directly influences over 80% of the spending in the home. This is the generation that wants the right information suited to their needs and context, delivered in the least amount of time. This group of users are socially connected through their mobile phone, laptop and desktop computers, and are the driving force behind enabling connectivity through TV. This generation wants to have personalized content; namely, content that is available on their own terms rather than on the terms of service providers and operators. This is the generation that does not want to be bound to a particular location or device to access specific content. They like to be able to watch TV content on any device and location within and outside of the home and not just on a TV display. They also want to be able to access Internet content and/or social networking services such as Twitter on their TV display while watching TV. They are not only content consumers but also content generators and distributors.

The third relates to advancements in technology, and particularly advancements in customer premises equipment ("CPE"). A household often no longer just has a single TV display and a PC but may have multiple laptops and PCs, along with TV displays and mobile devices, such as smart phones, cellular phones, net books, electronic reading tools, notepads, portable music and video players that users have and use at their homes (collectively, referred to herein as "user devices"). Additionally, users often have access to other user devices such as home residential gateways, set-top-boxes, routers, Wi-Fi access points and other networking equipment, and the use and availability of such equipment is growing rapidly. These changes mean that content is no longer created, controlled and distributed by a specific organization, such as operators, but instead content can be produced by anyone within a network and either pushed to or requested by anyone within the network. Such content includes place shifted video content, multimedia streams, and personal digital content. Therefore, a centralized approach wherein content is always produced by a selected entity and then distributed to subscribers will no longer be effective due to variation between user interests and because many users wish to play a more active role in generating content. Additionally, to centralize all content being created for distribution also will not be effective due to the heavy network traffic that would result from distributing such content.

The prior art solutions available include one or more of the following shortcomings. One shortcoming is their inability to authorize and authenticate a user by detecting the user's identity, the device that the user is using to access content, and the network over which the user is transferring content (e.g.: cellular phone network, cable television network, etc.). Another shortcoming is their inability to detect the user's proximity to a network node that has the desired content. Yet another shortcoming is their inability to allow one or more users to concurrently access pre-recorded content available on a server located at a user's home using a variety of different types of mobile devices, over a variety of network types, and/or over any supported native transport layer and application layer protocol that natively exists on the mobile device.

Another set of shortcoming include the inability to simultaneously serve multiple users through a single CPE while supporting multiple user devices through multiple network connections; reformatting content based on the format needs of the user devices that are being used to access the content; transferring content for the user devices based on the user devices' supported receive mechanism (e.g.: live stream, file download, flash player); and/or transferring, transcoding and transrating content based on the user devices' supported players and protocols, such as standard Hypertext Transfer Protocol (HTTP), Real Time Streaming Protocol (RTSP), Real-Time Transfer Protocol (RTP), RTP Control Protocol (RTCP), or proprietary third party protocols.

Yet another shortcoming is their inability to dynamically, using real-time and/or system-based (no human interaction) pre-processing, multiplex live incoming TV (from cable, IPTV broadcast, IPTV peer-to-peer, satellite, mobile, or other sources) streams with other types of content (e.g.: one or more of picture, text, video, and audio) from one or more of the Internet, local storage, and the cloud of nodes, into a single stream.

Yet another shortcoming is their inability to dynamically, using real-time and/or system-based (no human interaction) pre-processing, multiplex recorded multimedia content (from, for example, TV, Digital Video Disc (DVD), VoD, the Internet) in any format with other types content from one or more of the Internet, local storage, and the cloud of nodes, into a single stream.

Another shortcoming is the inability to dynamically provide selective heterogeneous content multiplexing based on a set of rules defined statically or based on dynamic conditions. A further shortcoming is the inability to provide live TV tuner sharing between serving nodes ("SNs") when one SN (Guest SN) can receive content in any format that is coming directly from any source to a local SN. A "serving node" is any piece of hardware suitably configured to act as a server to store and distribute content to one or more user devices, and includes suitably configured CPEs.

Yet another shortcoming is their inability to create/manage/control multiple accounts on a SN to access content, watch live or recorded content, request that content be recorded, share content, tag video clips, record video clips, watch clips based on tags, and/or send specific tags. A further shortcoming is their inability to dynamically load an application, module, service, or process that could support a user's request for content or their inability to interact with a user's mobile device such that the mobile device becomes a control device for interacting with a TV. This would entail utilizing full native keyboard and mouse functionalities on the display that is being utilized, which is very different than a remote control application that runs on a mobile device. The latter requires a separate application running on mobile device e.g. a remote control application. A yet further shortcoming is their inability to process a task automatically on behalf of a user based on a series of inputs inserted statically and/or in combination with intelligent data gathering about the user's preferences and subsequently predicting the user's expectations and needs.

There have been attempts in the prior art to create a distributed network composed of a series of serving nodes, but these solutions are not efficient. For instance, the content must be available and stored in multiple formats compatible with the format acceptable by the user devices that are used to access the content. Also, the content inspection servers must be available in multiple nodes of the network and Automatic Bit Rate (ABR) servers must predict the type of device that users will use to access the content. Shortcomings associated with the above approach include some of the following.

Pre-Formatted Content Storage for any Type of Device

Users' preferences are very different from each other when they are outside of home and away from their big TV screen. Deciding on storing the type of content for possible access from outside of the home is therefore difficult. Also keeping multiple formats suitable for all potential user devices that may be used is not efficient. Typical user devices renew and update data displays very quickly and therefore repeatedly mining data and archiving different formats for possible access by different user devices is cumbersome, costly and inefficient.

Content Inspection

The data traffic path for the user is not always the same. The purpose of content inspection is to identify the user's interests. However, the user's interest is best determined based on user habits over a period of time and not solely based on a snapshot of the user's current content usage. Distributing content inspection over multiple network nodes provides a snapshot of the user's current usage based only on the current traffic flow. Storing all traffic flows, determining the user identity, synchronizing the information for a post content inspection process in order to inspect usage over a longer period of time requires large amounts of storage, and extensive processing time. This is highly costly and inefficient. Conventional means allow the type of content the user is looking at any given moment in time to be determined, rather than a long term view. Consequently, the real preferences of the user under different conditions cannot be predicted accurately.

Automatic Bit Rate (ABR) servers—The ABR servers predict the type of user device that users will use to access network content and the network conditions over which the content will be transferred. This is conventionally done by either a client installed on the user device that sends device and network information to the ABR servers or by relying on native feedback protocols such as RTCP.

Problems exist with both of these approaches. Using clients that send extra traffic over the network to report on network conditions is inefficient. Additionally, in such a solution the ABR pre-formats multiple copies of content based on different network conditions that are stored and can be sent to a user device, such as a mobile device. The client software determines which format, size and resolution of the content to display. This approach results in the following fundamental problems: a) a large server is required to store the different formats of content; b.) a fast CPU is required to process and change the format of content in real time to provide for the multiple formats for each user, especially when hundreds of thousands of users are connected; and c.) extra unnecessary traffic results from sending multiple copies of content in different formats to the user's device; as well as Predicting network conditions based on RTCP feedback does not provide enough accuracy.

In the prior art, a CPE only facilitates providing CPE specific and vertical functions, e.g. a CPE that only provides Set-top-Box functionality or a CPE that provides Internet connectivity functionality. Furthermore, in conventional methods the CPE has no role in content distribution functionality among subscribers while they are at home or outside using different methods of connectivity and in delivering content concurrently to different devices and/or users in parallel.

Accordingly, there exists a need for a method and system that improves on at least one of the deficiencies of the prior art.

SUMMARY

A system for processing of multi-media content for a user device independent of the user device location is provided, comprising: a serving node configured to receive the multi-media content from a content provider via a network and configured to deliver the multi-media content to a plurality of user devices registered with the serving node; each of the user devices associated with at least one user selected from a plurality of users; each of the users associated with a record in a database accessible by the serving node; the database including content characterization of the user and preferences of the user, the content characterization and preferences of each of the user variable depending on the user device the user is using; wherein when the content is received by the serving node, the content is reformatted for display on one of the user devices selected by one of the users.

A method of processing multi-media content targeted for a user device independent of the user device location is provided, comprising: a serving node receiving the multi-media content from a content provider via a network and configured to deliver the content to a plurality of user devices registered to the serving node, the serving node collecting information by: identifying characteristics of the content; inspecting each received packet of the content from the network layer to the application layer; inspecting a URL associated with the content, and identifying if the content is manually requested by the user device or automatically generated as a sub URL within the main original URL that was requested; identifying if the URL is a crawler or static main; identifying the content type as video, image, text, audio or RSS feed; if the content is text, comparing the content against a keyword dictionary database; and storing the information in a database.

A method for processing of multi-media content targeted for a user device independent of the device location, providing a serving node configured to receive multi-media content from a content provider via a network and further configured to deliver the content to a plurality of user devices registered with the serving node, comprising the steps of: identifying a user associated with one of the user devices; identifying a type of device that the user is using for access; identifying a network the user device is using for connectivity to the serving node; identifying a state of the user, recording a time and date of access; identifying the type of content that the user device is requesting; identifying the location of the user device by receiving GPS location; determining characteristics of the user within that context (state) based on current behaviour and past history, and updating a user characteristics identifier table.

A method for processing of multi-media content targeted for a user device independent of the device location is provided, including providing a serving node configured to receive multi-media content from a content provider via a network and deliver the content to a plurality of user devices registered with the serving node; the serving node: identifying a screen capability, memory, processing ability and player of the user device; determining acceptable formats of the player; identifying a type of network by which the user device is connected; identifying a type of content; converting the multimedia content to a format acceptable to the player; converting a long page to multiple decks of page with page numbers on the bottom; and rearranging and resizing the content to fit a screen of the user device.

A method of processing multi-media content targeted for a user device independent of the device location is provided, comprising: providing a serving node configured to receive multi-media content from a content provider via a network and to deliver the content to a plurality of user devices registered to the serving node, the serving node: receiving the content as a native TV input in a format; decoding the input to a RAW picture frame; converting the RAW picture frame to a RGB32 format picture frame; identifying a screen layout and player of the user device; identifying a type of network by which the user device can receive the content; extracting additional content from a source to include in the content; overlaying the additional content to the RGB32 Raw picture frame; encoding the RGB32 Raw picture frame to a video stream supported by the user device; and sending the video stream to the user device.

A method for processing multi-media content for a user device independent of the device location is provided, including: the device requesting content from a serving node with which the device is registered; the serving node passing a location of the device to a server within the network; the server identifying a one or more serving nodes within the network having the content; the server calculating a closest path from aid user device to a serving node having the content, wherein the user device is not registered to the serving node having the content; the server sending a request for direct content distribution to the serving node having a closest path to the user device, and the location and access address of the serving node to which the user device is registered; the server sending a notification to the serving node to which the user device is registered of the location and access address of the serving node having the content; the serving node having the content sending the content to the serving node to which the user device is registered; and the serving node to which the user device is registered redirecting the content to the user device.

A method for a user to view content on a first user device and transition to viewing content on a second user device is provided, including: the user viewing content on the first user device, the first user device connected and registered to a serving node, the content transmitted to the user device through the serving node; the user selects a menu option to continue the content on a second user device; and the serving node continuing to stream the content to the second user device, and if necessary, reformatting, transcoding and transrating the content for the second user device.

A method for tagging multimedia content by a user operating a user device on a serving node, the user device registered with the serving node is provided including: the user selecting a portion of the content by indicating a selection; the serving node receiving a request for the selection; the serving node inserting a pointer reference to a frame sequence number associated with the selection; the serving node obtaining a start point and an end point of the portion; storing the content and the start point and end point in a database associated with the user; when the serving node receives a request to view the portion on a second user device, then reformatting, transcoding and transrating the content to provide the portion.

A method of collecting information about usage patterns of a plurality of users and a plurality of user devices is provided, each of the users and user devices registered with a serving node, the serving node configured to receive content via a network, and deliver the content to the plurality of user devices, comprising the steps of: the serving node handling all content traffic between the user devices over Wi-Fi, Ethernet, and broadband networks; the serving node collecting usage information by performing deep packet inspection, deep content inspection and content filtering to determine requested content on all of the content traffic; the serving node providing the usage information, a user id, user device id, content type, start time and end time to a server.

A method of interacting with a television display through a mobile device by utilizing a mobile device keyboard and mouse is provided, including the steps of: providing a serving node to which the television display and the mobile device are registered, the serving node having a web portal having a keyboard and mouse presentation; connecting the mobile device to the web portal on the serving node; presenting, on a screen of the mobile device, a keyboard and mouse interface fit to the screen of the mobile device; and using the web portal keyboard and mouse presentation to type, move and interact with the television display.

A method of adapting a bit rate for a mobile user device having GPS is provided, including: a client application on the user device obtaining GPS coordinates and differential coordinates; transmitting the GPS coordinates and differential coordinates to a serving node to which the user device is registered; the serving node calculating a speed of the mobile user device; using the speed to calculate a probable data transmission error rate and packet loss rate; and adjusting a content transmission bit rate to the user device based on the estimated data transmission error rate and packet loss rate.

A method of obtaining television content from a serving node having a plurality of television tuners, an active tuner for a channel being viewed on a user device registered to the serving node, and a plurality of available tuners, including: a module in the serving node configured to provide storing and forwarding in real-time of content received by the available tuners for viewing on other user devices whilst allowing the recording of the content at the same time as well. The serving node receives a request for a specific channel display; and if any of the TV tuners are receiving the requested channel: if the active TV tuner is receiving the requested TV channel then the serving node storing TV content associated with the requested TV channel in small blocks that are transmitted to a requesting user device; if the active TV tuner is not receiving the requested channel then the serving node sending a request for the channel to a server; the server determining a second serving node, the second serving node receiving the requested channel; the server facilitating handshaking between the first and second serving nodes; the second serving node transcoding and transrating the content provided by the requested channel for transmission to the first serving node; the first serving node receiving the transcoded and transrated content and providing the content to the requesting user device.

A method of unscrambling a multiplicity of television channels on a single bandwidth, including receiving, at a TV tuner, the bandwidth frequency; all channels offered by a video source within the bandwidth; each of the plurality of channels differentiated by a code; on a request from a user device for a channel to a serving node, providing the serving node with the code; using the code to separate the requested TV channel; on receipt of a second request from a second user device for a second channel; receiving a code for the second channel and applying the code to separate the second channel concurrently with the first channel; providing the first channel to the first user device and the second channel to the second user device.

A method for two-way processing of multi-media content targeted for a viewer's device independent of the device location is provided, comprising a computer-enabled content processing unit or serving node capable of receiving multi-media content from a content provider via ordinary network means and further capable of delivering desired content to a plurality of content users within the domain of the content processing unit, a computer program software unit running on the content processing unit; the computer program software capable of watching multiple video streams from different source on same display but each on different areas of the display, whilst watching the live TV stream, comprising the steps of: The user is watching live TV stream on his/her device; the user invokes the menu and choose the video content aside (TV, Internet, Personal, live camera) where source coming from Live TV from the other TV tuner (local or shared); Live Camera stream; stored on either his/her own serving node; a serving node that is part of the same social networking group; a serving node that gives permission for others to have access and receive content from. The user makes request for the stream(s) by selecting from the menu item; the USER GUI Engine (UGE) receives the request; the UGE pass the request to the streamer proxy receives the request; the streamer proxy locates the video content; the streamer proxy may work with different modules each responsible for a source of requested video; the streamer proxy determines the type of device and network type through the User Tracker Module. Each source of video content will provide the streamer with their own content; the streamer makes the request from the transcoding and transrating module for the video delivery to the device; the transcoding and transrating module push each video content to the player of the device that made the request. The player notifies the UGI of the availability of the video contents; the UGI Split the targeted screen; the UGI provides the x,y coordinates of each portion of screen to the player; the player redirects the available TV stream and the video contents to each X,Y coordinates and portion of screen. The user will be able to view all streams each on one portion of the screen; the user may have the audio enabled for all the streams, or may select a portion and disable the audio; and the audio may get invoked as the user moves between different portions of display that play a video content.

A method for two-way processing of multi-media content targeted for a viewer's device independent of the device location is provided, including a computer-enabled content processing unit or serving node capable of receiving multi-media content from a content provider via ordinary network means and further capable of delivering desired content to a plurality of content users within the domain of the content processing unit, a computer program software unit running on the content processing unit; the computer program software capable of overlaying and interacting with contents of heterogeneous characteristics such as TV, Game, Internet browser (full, micro, widget), including the steps of: the user invokes the menu and choose the contents of interest, TV and/or Game, and/or Internet browser (full, micro, widget); the USER GUI ENGINE (UGI) receives the request; the UGI interacts with the User Tracking module to identify the type of device and network of user; the UGI sends the request to each source of content, TV tuner and/or Game proxy and/or Internet browser (full, micro, widget); each source make the request for the stream and/or content of Interest; each source interacts with the streamer, transcoding and transration separately; each streamer, transcoding and transrating interact with User Tracking module separately to identify the targeted device and therefore convert the content to fit the targeted screen, player, device type, and network type; each streamer, transcoding and transrating notify the player for the video content and Internet browser container proxy and game container proxy of the availability of the content; each container proxy module will inform UGI of the availability of the content. The UGI Split the targeted screen; the UGI provides the x,y coordinates of each portion of screen to the player and each container proxy; each player and container proxy redirect the available content to their own X,Y coordinates that have received from the UGI; the user will be able to view all contents but each on one portion of the screen; the user interacts with each content by selecting a portion of screen where the content of interest; and the interaction is through remote control and/or mouse and keyboard and/or joystick

BRIEF DESCRIPTION OF THE FIGURES

FIG. 10 is a block diagram illustrating a content transcoding engine.

DETAILED DESCRIPTION

Figure 1:
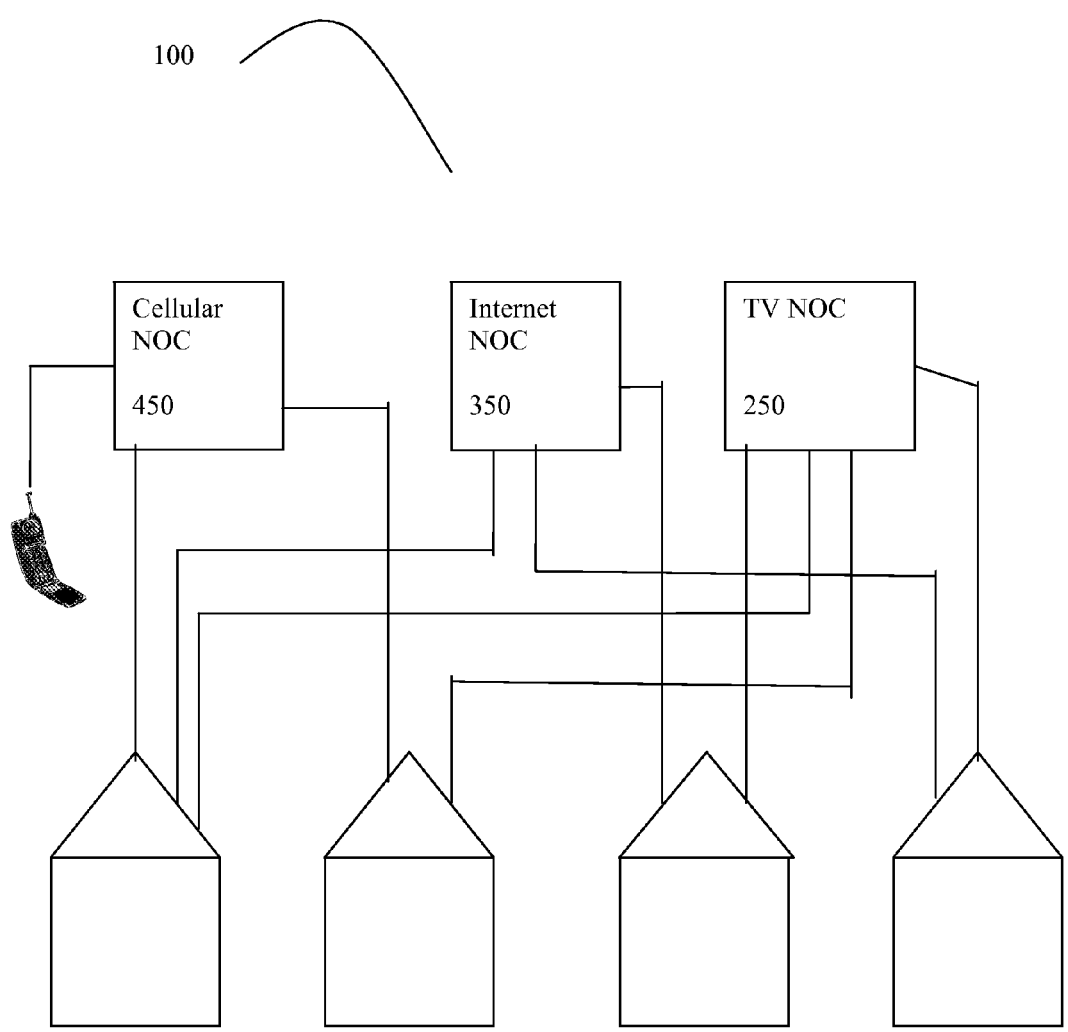
FIG. 1 is a block diagram illustrating a prior art network services a number of user devices with both wireless and wired (landline) connections.
Figure 2:
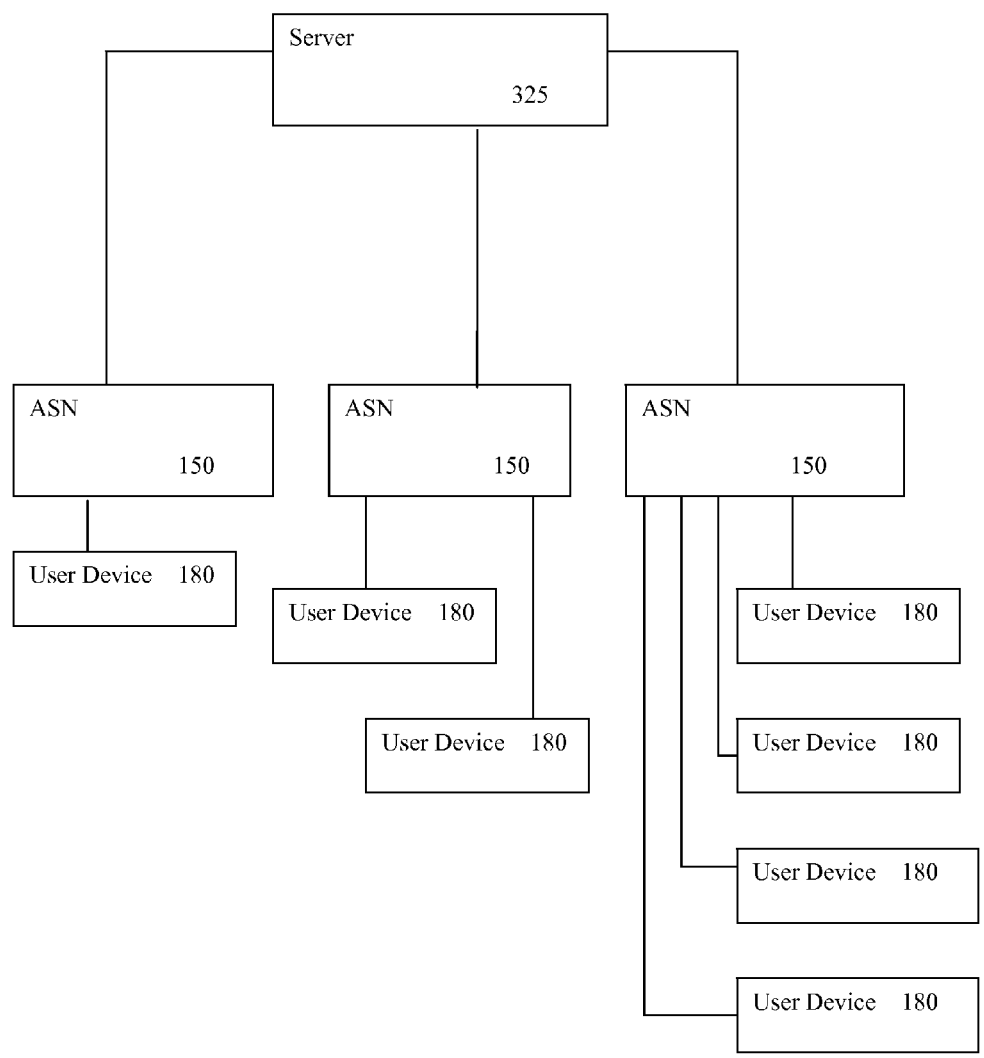
FIG. 2 is a block diagram showing a micro-cloud according to the present disclosure.

The embodiments described herein are directed at creating a network (or "micro-cloud") of service nodes, referred to as application serving nodes ("ASNs") 150, with each ASN being a configured CPE, as seen in FIG. 2. Each ASN acts as one node within a content distribution network ("CDN" 15), and is used to forward content to one or more user devices that are registered to use that particular ASN 150. The CDN 15 formed by the ASNs 150 and by the user devices 180 registered to each ASN 150 constitutes a "micro-cloud". ASNs 150 are be able to communicate with each other throughout the micro-cloud, either directly, or through server 325.

Figure 3:
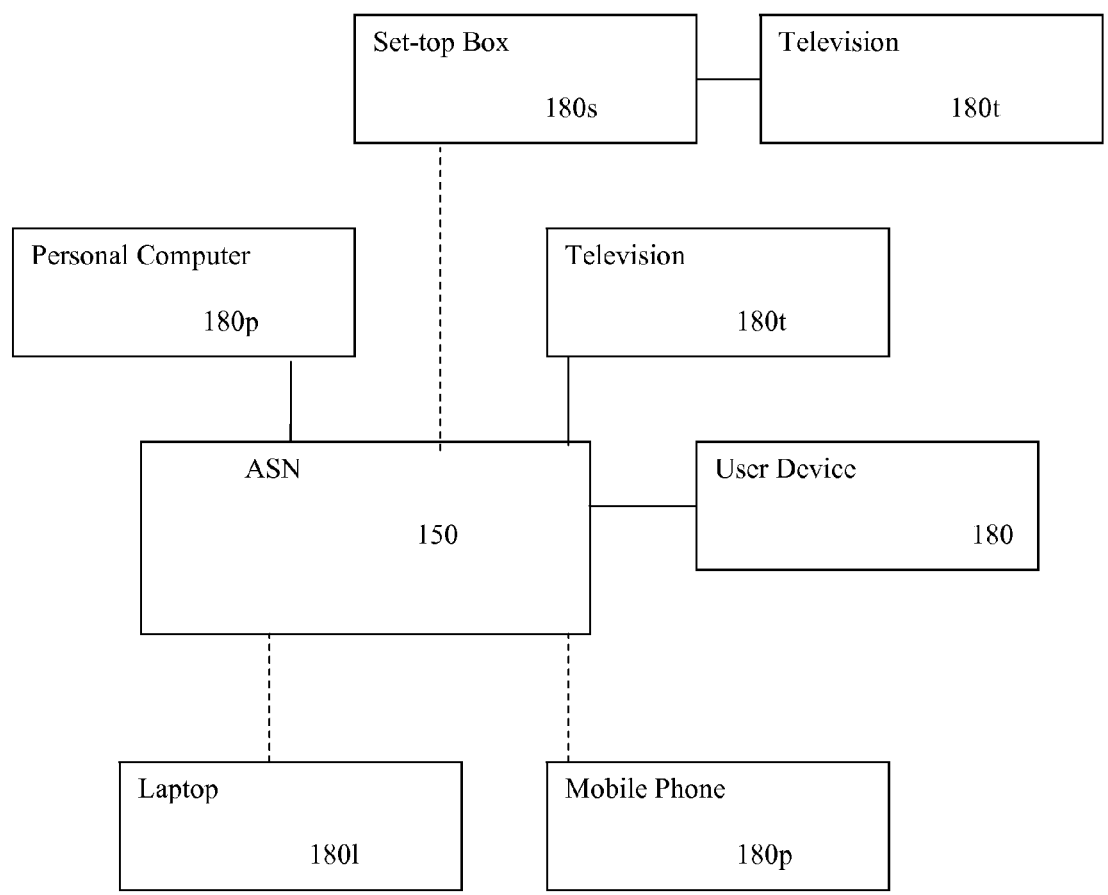
FIG. 3 is a block diagram showing an ASN and connections to a variety of user devices.

As seen in FIG. 3, ASN 150 may have the base functionality of a conventional CPE and is also the operators' controlled node that runs applications for users registered at the premises served by ASN 150, as shown in FIG. 3, is connected to TV 180*t*, mobile phone 180*p*, laptop 180*l* and personal computer 180*p*. ASN 150 may be in communication with a set top box 180*s* connected to a user device 180, such as TV 180*t*, that functions as a slave unit. ASN 150, depending on the users' connectivity (for example, if the user can connect to the CDN through a wireless connection that is faster than the user's current wired connection, ASN 150 will transmit data through the wireless connection), and provides usage information to the operators. In FIG. 3, wired connections are shown in solid lines and wireless in broken lines. This architecture eliminates the need to run costly NOCs, and allows users to access data of many types, such as multimedia messaging, wireless VoIP, streaming video, video telephony, corporate applications, email, and wireless gaming.

Figure 4:
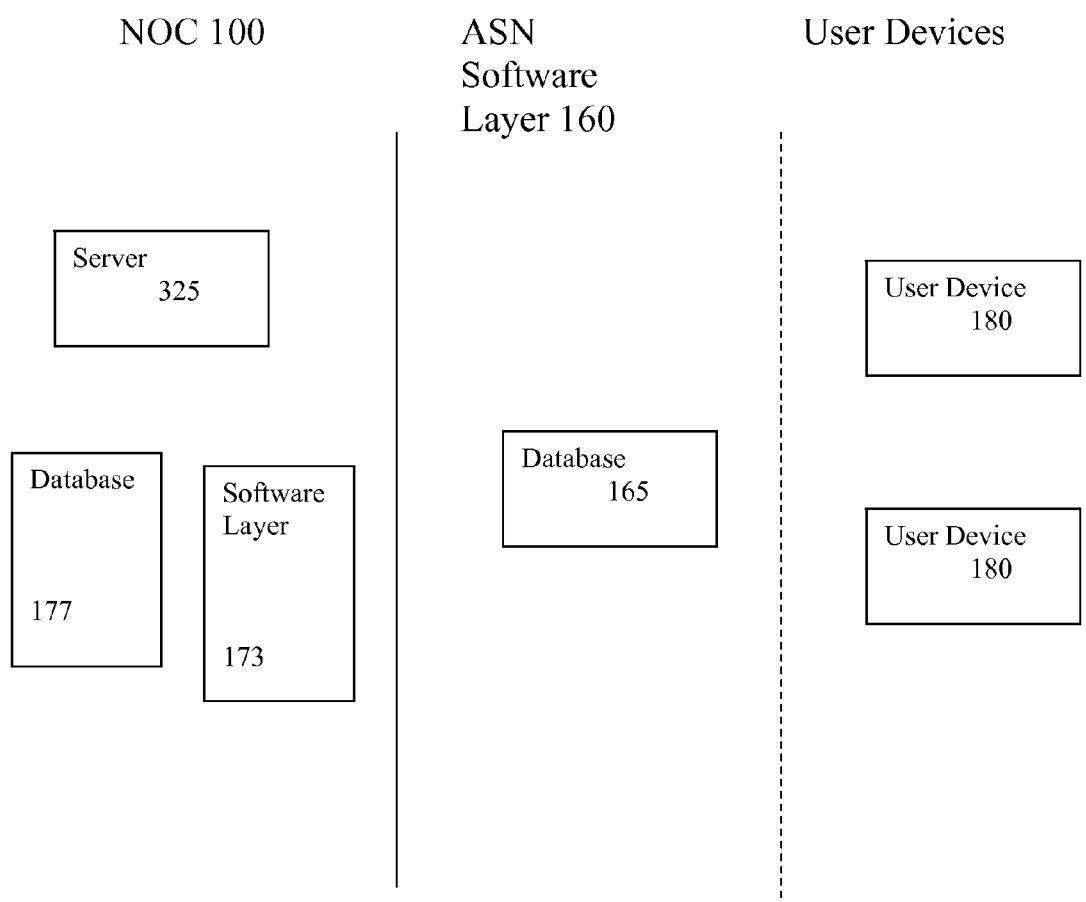
FIG. 4 is a schematic illustrating the relationship of an ASN software data layer accessed with by an external data centre.

FIG. 4 depicts the relationship between a software data layer 160 on the ASN, other ASN software and hardware modules, such as database 165, and a typical NOC 100, with server 325 having software data layer 173 and database 177.

Figure 5:
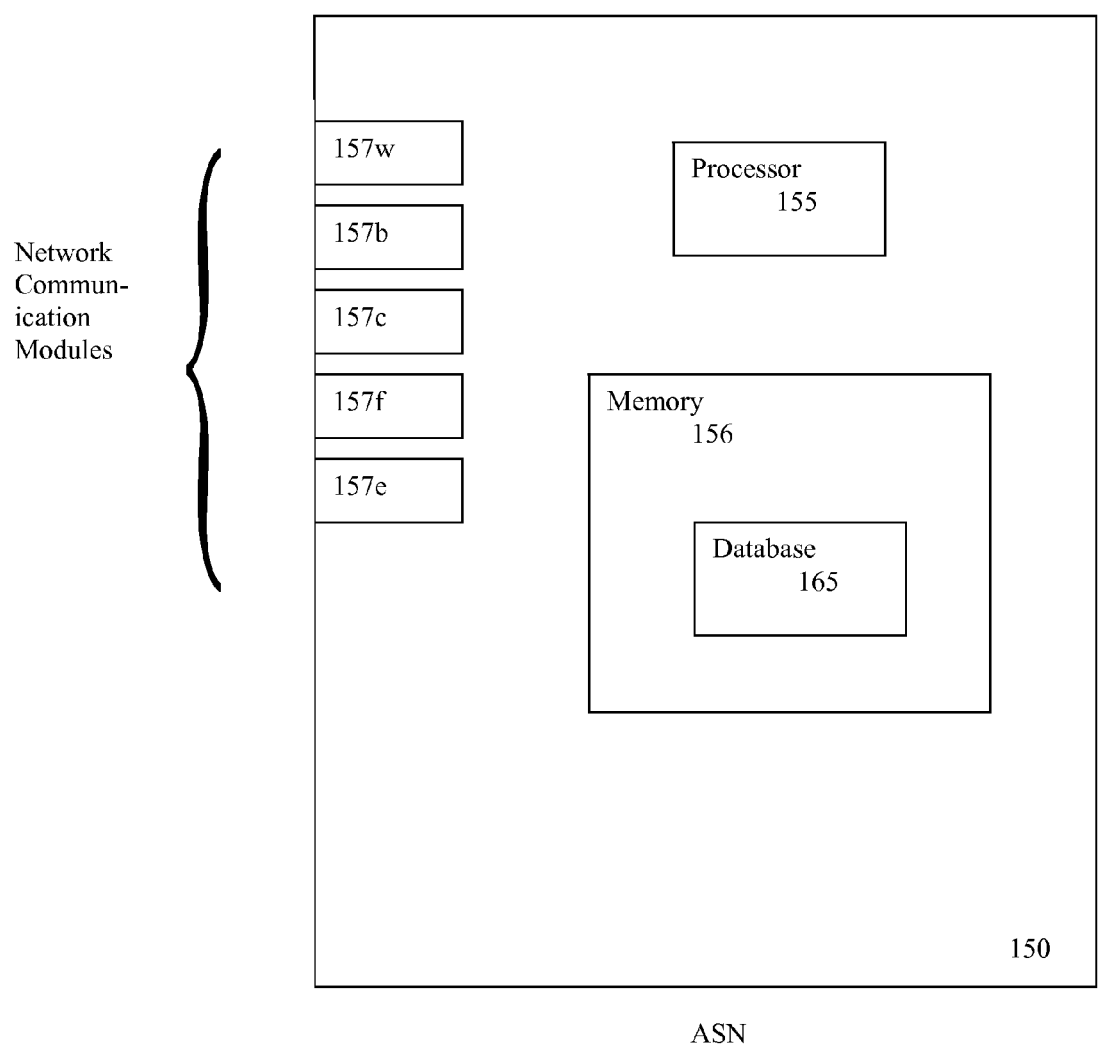
FIG. 5 is a block diagram showing an embodiment of an ASN according to the present disclosure.

As shown in FIG. 5, each ASN 150 includes processor 155 that executes software, including a variety of software modules described below. The processor 155 is coupled to memory 156 in the form of both permanent (flash memory or hard disk storage) and volatile stores (random access memory). Database 165 is typically stored in memory 156. The operating system of the ASN 150 and the various modules described below are stored in the permanent memory storage such that ASN 150 can be powered on and off without having its software erased. During execution, parts or all of the software stored in the permanent memory store of the ASN 150 are copied into the volatile store where it is executed by the processor. ASN 150 also includes network communication modules 157, such as Wi-Fi port 157*w*, Bluetooth port 157*b*, cable port 157*c*, femtocell port 157*f*, and Ethernet port 157*e*, that are in communication with processor 155 and that are used to send and receive content, as described in more detail below.

Each ASN 150 includes a software platform that can be implemented using any suitable programming language and that manages the traffic for all users registered at the premise associated with the particular ASN 150; such traffic includes TV traffic, traffic from multimedia Internet browsing, game consoles, and other digital equipment accessed by one or more users using their user devices 180 of choice. This use of ASNs 150 specifically addresses the challenges of distributing both homogenous and heterogeneous content over a core-centric broadband network. In the embodiments described herein, ASN 150 is used as an element of the CDN 15 and is particularly configured using intelligent software to enable user identification; device identification; access network identification; multiplex content of heterogeneous types; transfer, transcode, and transrate content; distribute content among peers of ASN 150; and also provide an API for developing, loading and running applications. ASN 150 allows triple/quad player operators to move the common functionalities of transcoding, transrating, deep content inspection and packet inspection, content reformatting and collecting usage data from NOC 100 to ASN 150 and create a micro-cloud including a small subset of users registered at a premise. The premise may be a home, or it may be another group of individuals, typically living in a common space such as an apartment or the floor of a dorm. NOC 100 will not require additional inline servers for performing such functions in the micro-cloud.

ASN 150 according to an embodiment of the present disclosure includes a software platform that provides the ability to load a set modules and engines statically or dynamically to support multiplexing and distributing content. These modules include a series of proxies in order to support connectivity through different protocol.

Proxy Modules

Figure 6:
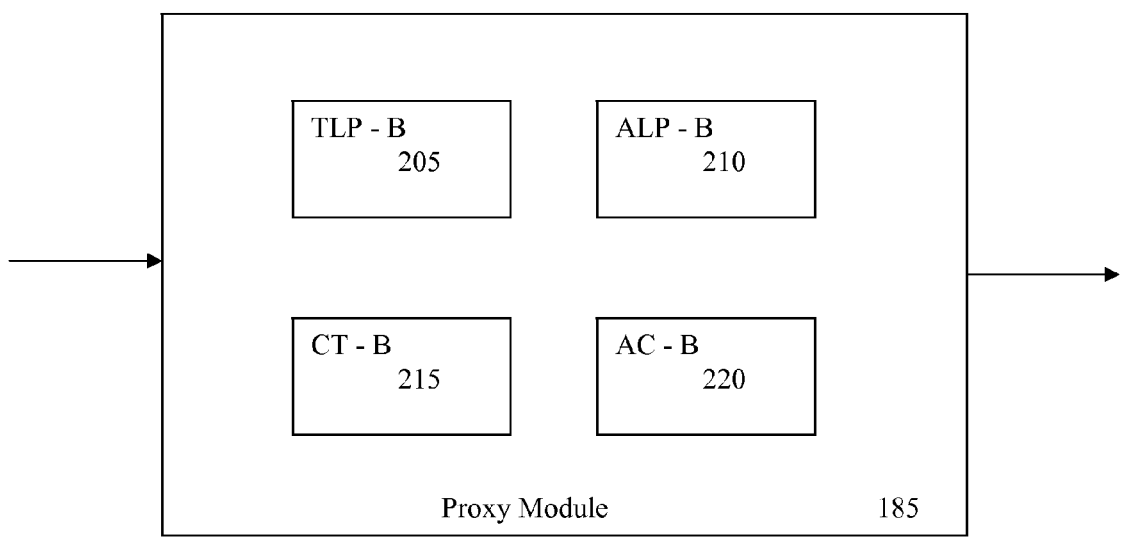
FIG. 6 is a block diagram showing the proxy module.

As shown in FIG. 6, Proxies act as a protocol and connectivity bridge between a user and a data source or destination. These bridges work with various software modules and engines to assist in performing certain tasks. Within proxy module 185, are the following bridges for performing the following tasks.

Transport Layer Protocol Bridge (TLP-B) 205 handling: where multiple network nodes are communicating through different native transport protocols, the TLP-B is responsible for converting signals sent to or from nodes (one or both of these nodes is within the micro-cloud, such as user devices 180) into the proper protocol in order to support communication between nodes without making any change to the substance of the nodes' native request. E.g. If Node 1 communicates using UDP, while Node 2 communicates through TCP and Node-n communicates through RAWIP, then TLP-B 205 within ASN 150 converts and sends data from one protocol format to another protocol format.

Application Layer Protocol Bridge (ALP-B) 210 handling: where multiple nodes are communicating through different native application protocols, ALP-B 210 is responsible for converting signals sent between nodes into the proper protocol in order to support communication between nodes without making any change to the substance of the nodes' native request. E.g. Node-1 sends a HTTP request for video to the video source which only accepts RTSP and Node-n sends a Flash request for the same video to the video source which only accepts RTSP. In this case the ALP-B 210 within ASN 150 converts HTTP and Flash requests to RTSP such that the video source can receive the request and also converts the RTSP video to both HTTP and Flash so that the requesting nodes can receive the video.

Content Transforming Bridge (CT-B) 215: where multiple nodes are supporting access to content in different formats, CT-B 215 provides the content conversion functionality that makes available the content to the nodes in different formats. E.g. Node-1 can access the content through live stream, while Node-2 can only access content by reading a file. CT-B 215 provides the content reformatting of the source to support both formats simultaneously.

Access Continuity Bridge (AC-B) 220: The user may be accessing content through a first user device $180_1$ and then leave the first user device $180_1$ and move to another user device $180_2$, but still wish to access the same content that was being accessed through the user device $180_1$.

In such a case, AC-B 220 provides continuity of content to the new user device. The above proxies are implemented in the modules described below.

Modules for Registering Users and Confirming User Identity (UT-E Module)

Figure 7:
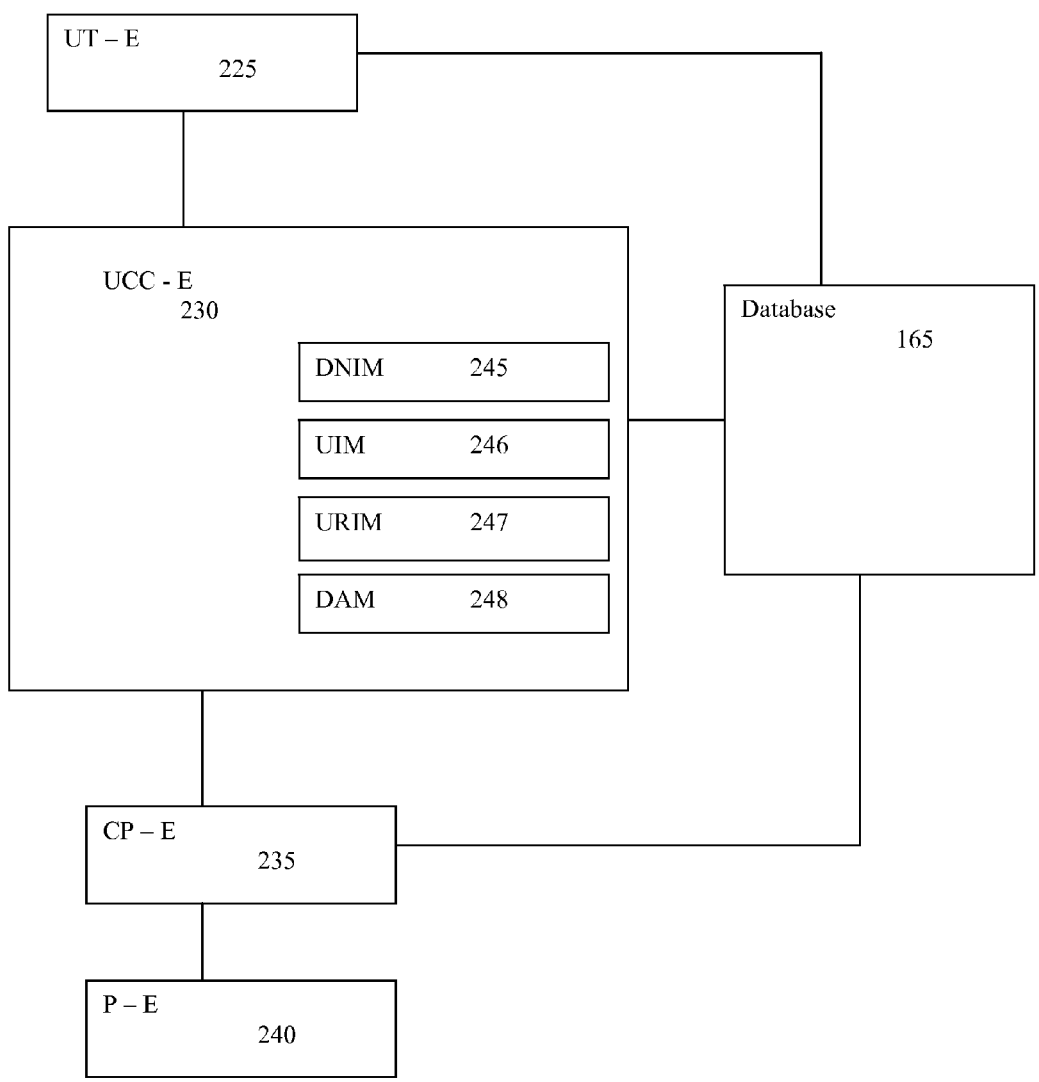
FIG. 7 is a block diagram showing the UT-E, UCC-E and CP-E.

As shown in FIG. 7, another set of modules are responsible for registering users and confirming user identity. This is done through a registration and activation method using a synchronization approach (an approach in which user identity information is synchronized with network operators' identity and policy servers) by supporting an interface identity (a database interface layer that communicates with network operators' databases that store users' identity and policy information), Bluetooth connectivity, Wi-Fi, Ethernet, Femtocell or any other form of connectivity. This is accomplished by exchanging the interface id with ASN 150. In addition to that this module, the User Tracking Engine (UT-E) 225, is able to track users. UT-E 225 contains information on the active user devices being used, user identity, user location, network connectivity and user proximity to ASN 150. User proximity to ASN means that UT-E 225 has routing measurement functionality that determines an optimal path for data transfer and for ensuring that users can access content via ASN 150 that is in closest proximity to them. To enable this functionality, a client application 328 is present on user device 180 (other means of measurement through lower protocols may be used in order to avoid having client software on the user device). UT-E 225 also maintains information on currently accessed content, including TV channels, PVR, VoD, Internet websites, and the type of content (e.g. video, text and/or mixed), and provides information to a User Content Characterization Engine (UCC-E) 230, described in more detail below. UCC-E 230 uses this information as a set of parameters to characterize users. The history of UT-E 225 is used by UCC-E. 230 The history includes user state information, such as which user connected, on what date and at what time the user connected, what user device 180 the user used to connect, from where the user connected, over what type of network the user connected, what content the user accessed, and for how long the user was connected.

For the user to setup their user account with ASN 150, the user can register with ASN 150 and then register each user device 180 they plan to use to access content with ASN 150. Any registered user devices 180 will synchronize with ASN 150, during which ASN 150 receives information about the user devices 180, their abilities and their limitations. ASN 150 then internally assigns the registered user devices 180 to the user, and allows access to content through the registered user devices 180.

ASN 150 is also able to distinguish between different users. To accomplish this, all requests redirect to ASN 150 through a unique identifier URL, which is a combination of MAC address, physical premise address, and ASN 150 serial number. A user is identified by verifying the unique ID that the ASN 150 assigned to the user device 180 during device registration, and the user's username and password. Information in addition to username and password is useful to identify the type of user device 180 that is used to connect to the network. ASN 150 then identifies the connected network through the interface at which the request was received; the connected network can be any of a web portal; WAP portal; Bluetooth portal; Wi-Fi portal; Femtocell portal; and Ethernet portal.

Content Personalization Engine (CP-E)

Another module is Content Personalization Engine (CP-E) 235. CP-E 235 uses both UCC-E 230 and UT-E 225 modules. CP-E 235 is based on an automatic intelligent search engine that locates content matched to a user's content preferences. CP-E 235 can be an engine within ASN 150 or an external service engine on the content distributor side.

Internal CP-E 235 within ASN 150: In this embodiment, as shown in FIG. 7, an internal CP-E 235 resides within ASN 150 and interfaces with both UCC-E 230 and UT-E 225. CP-E 235 searches the Internet and content producers and distributors on behalf of each user that is registered with ASN 150. CP-E 235 indexes the content and prepares the content for the user.

External CP-E (not shown) on the content distributor side: In this embodiment, an external CP-E may be a large personalization server operated by a content distributor, who may be, for example, an advertising company having relationships with operators. External CP-E receives information from UCC-E 230 and UT-E 225 (through common and single interfaces). CP-E then matches the content (which, for example, when the content distributor is an advertising company, is an advertisement), and pushes this content to ASN 150.

Combined model: In a combined model embodiment, the internal CP-E 235 acts as an agent of the external CP-E. Internal CP-E 235 supports external CP-E interface, and the internal and external CP-Es are thereby able to communicate. Internal CP-E 235 acts as an agent on behalf of the users, and communicates with external CP-E to receive matched content. Internal CP-E 235 may also find matched content from other ASNs 150 that are within range of a particular user device 180, even if the particular user device 180 is not registered to the other ASNs 150. As this functionality involves a particular ASN 150 utilizing its bandwidth to send content to user devices 180 that are not registered to the particular ASN 150, in certain embodiments this functionality must be explicitly authorized by the users. External CP-E can be a higher level service that interfaces with many content distributors for finding matched content. The decision making rule of the internal CP-E 235 is based on a configurable set of rules that is updated and modified remotely.

In order to identify the characteristics of content when a user is browsing, the CP-E (either internal CP-E 235, external CP-E, or the combined model, as described above) inspects every received packet from the TCP/IP layer to the application layer of the content; inspects the URL and identifies if the URL was manually requested by the user or automatically generated as a sub URL within the main original URL that was user requested. If the URL was automatically generated, then the CP-E (internal CP-E 236, external CP-E, or the combined model, as described above) determines if the URL is a crawler or static main. Content being sent from a "static main" URL is content that the user has explicitly requested; content being sent from a "crawler" URL is content such as advertisements, etc., that accompanies the content sent from the "static main" URL but that the user has not explicitly requested. The type of the content is then determined as being video, image, text, audio, or RSS feeds, for example. If the content is text content, the content is checked against a keyword dictionary database in order to categorize the content. The information in the content is ultimately inspected and extracted.

User Content Characterization Engine (UCC-E)

UCC-E 230 is another module running on the software platform. A great deal of multimedia content is available on the Internet, which is accessed by many users through different types of user devices 180 including TV, mobile phone and laptop/PC. One problem with this large amount of content is how any particular user finds the particular content he or she wants to access. Content personalization is a complex process. Companies are personalizing content using keyword, category and rating. For example, YouTube™ personalizes content based on keywords (e.g. "painting" and "Picasso"), category (e.g. "art") and rating (e.g.: 1-5 stars).

Figure 8:
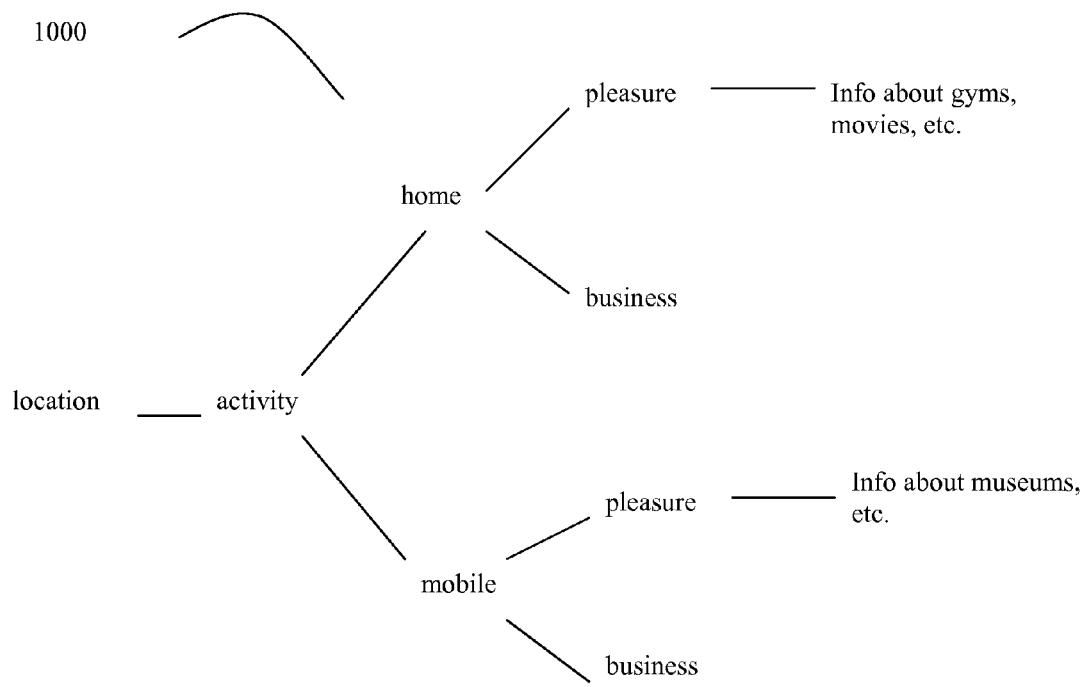
FIG. 8 is a user characterization tree and branches for identifying content of interest to a user.

Another way to personalize content is to provide support in terms of how the content is viewed by the user; for example, content can be personalized to suit the format and resolution of the type of user device 180 on which most users experience content. For operators, the challenge with personalizing content in this manner is that core-centric systems that personalize content are very complex. Personalizing content with core-centric systems is complex because user identity may not be known; and because millions of users may be simultaneously browsing content, which makes timely processing of user requests by one system difficult. ASN 150 of an embodiment of the present disclosure incorporates UCC-E 230, which is one of the software engines within the middleware that runs on ASN 150. "Context" is defined herein any information that can be used to characterize a user. For example, a user can be characterized according to his/her location, time (e.g.: does the user prefer viewing a certain type of content in the morning vs. at night), type of user device 180 the user is using, network that the user is using to access content, and typical activities that a user performs within that context (state). The context (state) of a user defines a list of appropriate activities. FIG. 8 illustrates an example of a user characterization tree 1000 that could be used to identify content of interest.

UCC-E 230 is responsible for building a user characterization tree and for tailoring it to a particular user. Personalization Engine (P-E) 240 will use these characteristics to find content which is most usable and likely to be of interest to the user. To match the content to a user, P-E 240 distinguishes between the management, updates and matching of the content and reusable content such as news, movies and advertisements. Both UCC-E 230 and P-E 240 are highly configurable in terms of algorithms, thresholds and weights.

UCC-E 230 is a service itself. UCC-E 230 serves other engines which require information on user identity and context (state). Therefore UCC-E 230 is a service with an objective, which is characterizing users. User characteristics dynamically change. Some characteristics change abruptly while some change more slowly over time. Therefore, UCC-E 230 determines user characteristics using both current conditions and historical conditions. Therefore, both current and historical conditions are input to UCC-E 230. In addition, some social variables also impact user characteristics. By "social variable", it is meant a variable that affects multiple users simultaneously. As an example, a XMAS event for two users leaving the same neighbourhood can be of different importance for, and have different effects on, the users. At the same time, a user may not typically be interested in politics but may temporarily become interested in politics for a period of time; for example, many Canadians became temporarily interested in American politics during the 2008 American presidential election. This means that the periodic social event (such as XMAS) and instant social events (such as the election) are also inputs to UCC-E 230. Therefore the end result varies according to all inputs.

In order to characterize a user, UCC-E 230 first categorizes the content that the user views. For example, content can be described according to title, keyword, and category; time and location; user description; preference; and history. Content can also be characterized according to context information that is particular to a user, as opposed to the content. These descriptors include the time at which the user views content; the location of the user when viewing content; the activity of the user when viewing content; the profile of the device the user is using to view content; and the active network access profile of the user. UCC-E 230 can also use user description extensions, which include the user's gender, age, and other interests, activities, and demographic information.

Over time, UCC-E 230 is able to detect a typical user session from an atypical user session. One way to detect the atypical session is to use Mahalanobis distance statistics in a user session space. Detecting outliers (atypical sessions) is valuable for cleaning noisy user sessions and avoids characterizations based on random or false information. UCC-E 230 takes the history into account since if what are considered to be atypical sessions are happening on a regular and periodic basis, then user habits may have changed such that these atypical sessions are no longer atypical but are, in fact, typical sessions. UCC-E 230 also detects the page request as per user action vs. system or automatically generated web action, which by itself is a category of content description as to which user has viewed (pushed, or pulled). UCC-E 230 contains multiple modules, including:

Data Nature Identification Module (DNIM) 245 is used to identify the nature of data: UCC-E 230 understands the type of content structure by examining the data structure and its nature; for example, UCC-E 230 determines whether the content is transmitted using XML, HTML, XHTML, or Flash. This provides UCC-E 230 the fabric nature of data. By "fabric nature", it is meant the language in which the data is encoded; for example, in XML, HTML, XHTML. This is validated against a structural dictionary (containing the format) that is updated dynamically. This validation can be done automatically by ASN 150's CPU, manually by a person, or using a combination of both. Once this has been done then UCC-E 230 identifies the state, which provides information on whether the content is dynamic, static, or an RSS feed (content that is updated periodically).

User Identification Module (UIM) 246 is used to identify the user and the user device 180: UCC-E 230 distinguishes different users from each other and, when a user accesses content using different user devices 180, distinguishes that user's different user devices 180 from one another. UCC-E 230 accomplishes this using pre-registration of all users' user devices 180 and, when one user device 180 is used by multiple users, by relying on the user account settings on the user device 180.

User Request Identification Module 247 is used to identify the user's request as compared to an automatically generated request: UCC-E 230 distinguishes between an automatic update of content within a webpage as opposed to content that is updated at the user's request. This is done through bridge components that track the incoming user request from the incoming request/response generated between the bridge and the source and final destination of the content.

Data analyzer module 248: UCC-E 230 has data analyzer module 248 for collecting the data from the above modules 245, 246 and 247, for analyzing the data and for making a decision. Therefore while the three above modules 245, 246, and 247 identify the structure and nature of the data, identify the user and user device 180, and separate manual from automatic requests, data analyzer module 248 reviews the result from each of the above three modules and identifies the pattern of content and the user's usage pattern in terms of predicting what content the user prefers.

In order to identify user characterization, UCC-E 230 identifies the user; identifies the type of user device 180 the user is using to access content; identifies the network the user is using for connectivity; and identifies the state of the user. The state of the user may be, for example, a business user, a home user, or a user who is on vacation. UCC-E 230 records the time and date on which content is accessed. UCCE-E 230 identifies the type of content that the user is requesting, watching, or browsing, and also identifies the location of the user, if available, via GPS. This data is compared against historical data. UCC-E 230 then determines user characteristics based on current and past user behaviour. UCC-E 230 updates a user characteristics identifier table. UCC-E 230 then archives all collected information, identifies the user device 180 that the user is using to access the content, identifies the network that the device is connected to, scans the request that is coming from the user, scans content being transferred to the user, records the period of time at which the user is at the user selected address, records the ideal state time, and updates the user characteristics table with the information. This information is stored in database 165 for later access.

TV Transcoding Engine (TVT-E)

Figure 9:
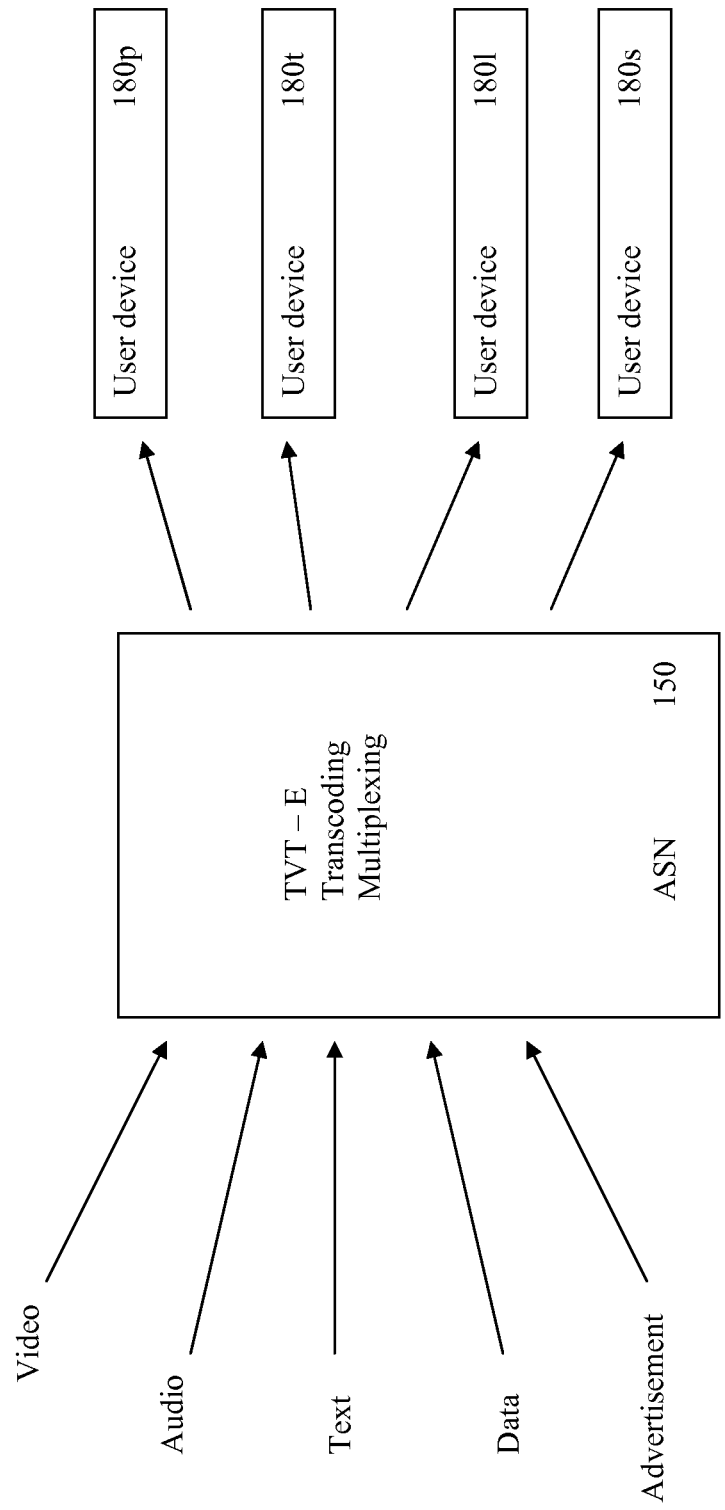
FIG. 9 is a block diagram illustrating traffic multiplexing and distribution performed by an ASN that is able to transcode, transrate, and reformat and distribute content.

With increased connectivity of various consumer electronic devices and the explosion of digital content, home networking is becoming a significant driving force for the multimedia industry. FIG. 9 illustrates the role of ASN 150, which receives digital content from various sources, and then has to multiplex the different types and formats of the content into a single format and distribute it to a range of registered user devices 180 and users on the premises. Content may arrive in a number of different formats (e.g., MPEG-2/4, H.264, etc. for video; MP3, AAC, WMA, etc. for audio; and so on), and is distributed seamlessly to a variety of different user devices (e.g. TV, desktop computer, PDA, cell phone, etc.) whose processing power, memory, and display capabilities can differ significantly, and each user device 180 may utilize a different software player supporting a different content format. Also, the user device 180 could be connected to ASN 150 using any one of a variety of different protocols, such as FemtoCell, Wi-Fi, and Ethernet. FIG. 9 illustrates the high-level overview of the ASN 150 multiplexing multimedia traffic and distributing it to registered user devices 180.

In many aspects, video is the most demanding type of media due to the high bandwidth it requires and the processing power required to display it. Trade-offs exist between dealing with video content using video transcoding (video conversion between various formats) and video transrating (video conversion between various bitrates) from the points of view of complexity, quality, and error resilience.

Transcoding, in general, is the process of converting a video that is compressed in one format to another compressed format at a possibly different bit rate. The bit rates may be different because the video may also be transrated. Transcoding assumes an important role in modern video communication systems in that it facilitates interoperability between different pieces of equipment operating using different standards. Transcoding equipment typically includes a cascaded decoder 262 and encoder 264, as shown below in FIG. 10. Decoder 262 decompresses the original video, while the encoder 264 produces the desired format.

TVT-E module 260 is used to achieve a relatively high efficiency of transcoding between any particular pair of video formats (e.g.: MPEG2, MPEG4, Flash, motion JPEG). Conventionally, transcoding is done by reusing information embedded in the bitstream by exploring the similarity of coding paradigms between two video formats. In contrast, ASN 150 reuses the motion information to simplify the encoding process; thus encoder 264 can avoid motion re-estimation, which is the most computationally complex operation in the process. In addition, other macroblock (MB) and block information, such as coding mode, picture type, DCT coefficients, etc., are also extracted from the bitstream and selectively reused by the encoder in the TVT-E module.

Transrating is one of the techniques used in transcoding. Transrating refers to changing (typically reducing) the bitrate of an encoded video stream, without altering the video format. Transrating is used to preserve as good a quality as possible for rate-reduced video. Transrating can be useful in meeting low channel bandwidth requirements in video communications, and in matching the encoded video bit stream rate to low-end multimedia devices. Transcoding can be performed in various ways. Frame rate reduction is one of the ways to achieve a lower bit rate video stream. B-frame dropping is the simplest way to reduce the bit rate, since dropping other types of frames, such as I- and P-frames, requires motion re-estimation. Instead of scaling down video temporally, spatial resolution reduction is another way of transrating using frame size rescaling. In order to simplify transrating, especially to avoid motion re-estimation, compressed domain transrating can be used. Requantization is one of tools to transrate MPEG coded bitstream in compressed domain.

With respect to transcoding and transrating video, ASN 150 fulfills certain criteria in order to achieve a modular, scalable, and efficient design. Some of these criteria are discussed in the following.

Figure 11:
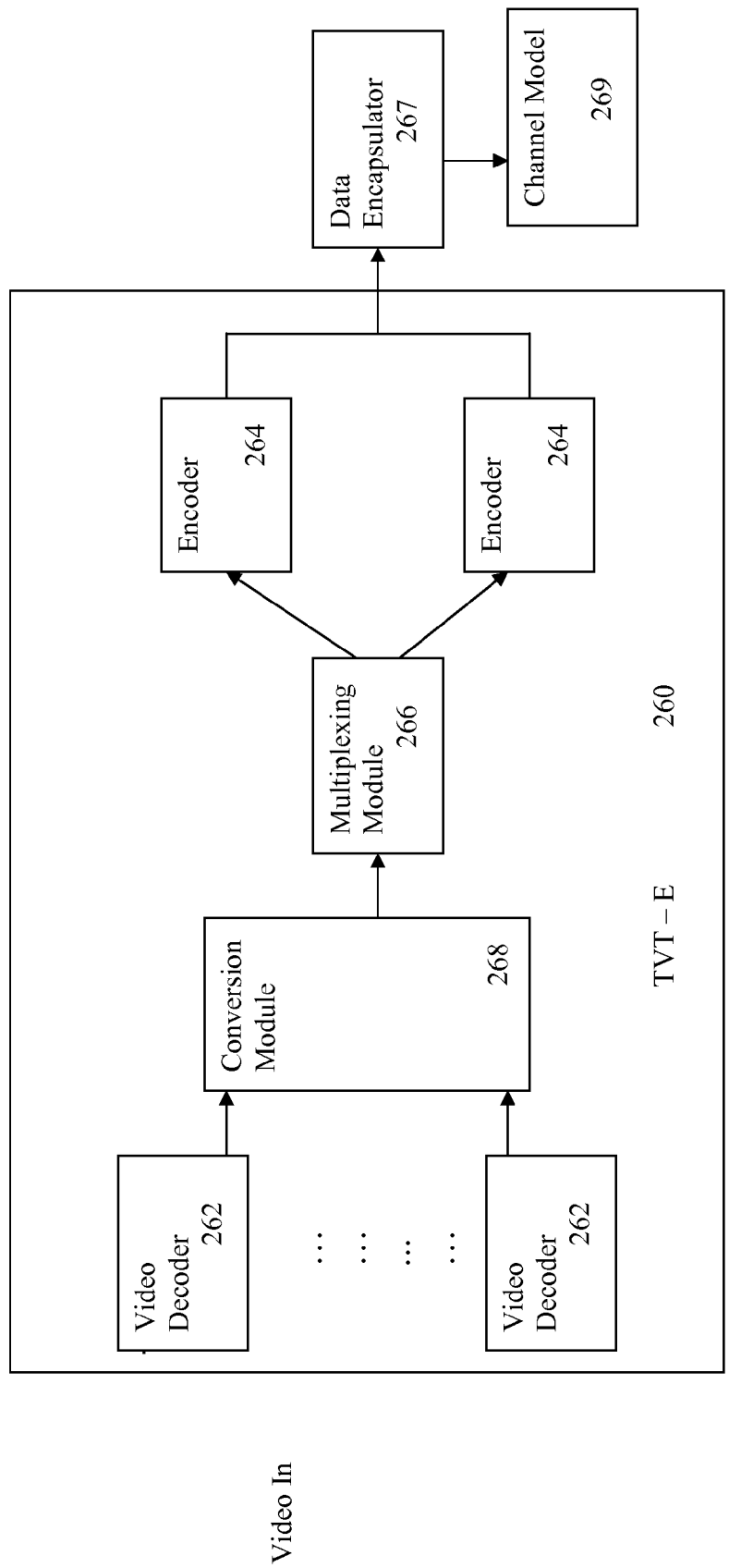
FIG. 11 is a block diagram illustrating how the content is decoded and then encoded to the best suitable format for the connected user device.

Modularity: it is desirable to preserve the modularity of the function blocks, such as video encoder 262, decoder 264, multiplexer 266, video streaming, channel model, etc., while enabling interaction between the blocks in an organized way. FIG. 11 depicts modular blocks in TVT module 260 of ASN 150.

Scalability: it should be relatively easy to add new functions related to home networking to the platform, e.g., audio format conversion, without modifying the system architecture or affecting the performance of other function blocks.

Efficiency: the platform should be able to realize all functions, especially transcoding between various formats, in an efficient way, and to quantify the corresponding complexity (processing requirements).

The transcoding architecture includes one full-featured decoder 264 and one full-featured encoder 262. This architecture results in high quality since the compression procedure is fully executed. However, this architecture also requires high computational and memory costs. According to an embodiment of the present disclosure, ASN 150 utilizes a conversion module 268 for reusing compressed information between two video formats, while using a performance reference for quality measurement. An overview of the transcoding and transrating on ASN 150 is described below.

Figure 15:
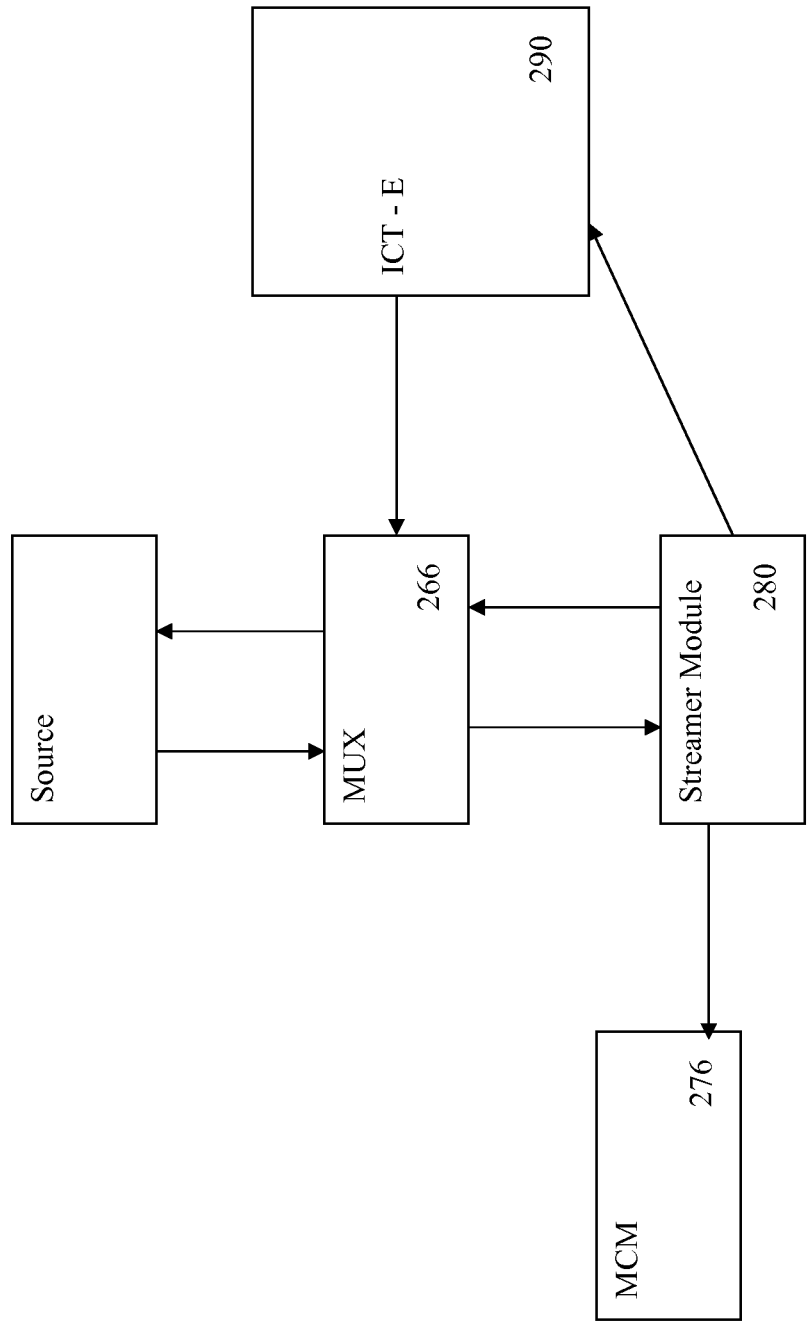
FIG. 15 is a schematic depicting interaction of the multiplexer, streamer module and Internet content reformatting engine of an ASN.

A simple operational scenario of the framework is that ASN 150 receives a video stream, transcodes it into the desired video format, optionally multiplexes it with other data (e.g. an advertisement), and sends it to a target user device 180 for playback over a home network. This framework can be broken into four main function blocks: 1) Video transcoding and transrating, 2) video multiplexing, 3) data encapsulation, and 4) channel model. FIG. 15 depicts each such block.

Video transcoding and transrating is a key component of this framework. Conversion module 268 investigates the similarity between the input video format and output video format, and reuses information from the input bitstream in the encoding process; thus, a great deal of computational complexity can be saved. Conversion module 268 is further divided into three independent sub-modules: parameter extraction and conversion module 270 (e.g. for determining the coding mode and picture mode), coefficient conversion module 272 (for converting motion vectors, and integer transformation), and flow control management module 274.

The multiplexing module 266 combines multiple video sources into a spatial multiplex video picture using a video interface protocol. Video objects ("VOs"), such as text overlays, are fed into the multiplexing module 266 along with their associated alpha planes, which determine the transparency of each pixel in each VO as a value between 0 (transparent) and 255 (non-transparent). Image compositing can be performed according to the alpha-blending algorithm described in MPEG-4 VM, for example. Starting with a background video object plane ("VOP"), all subsequently received VOPs are blended sequentially in the order defined by the video interface protocol. The resulting VOP is used as a new background VOP. This procedure is continued iteratively with subsequently received VOPs.

Data encapsulation 267 is the final step before ASN 150 transmits the video stream to a user device 180 using the home network. ASN 150 interfaces to the multiplexed video/ audio stream and all other necessary information (such as system commands) at the application layer, and adds the appropriate headers of the lower communication layers to create packets that are eventually transmitted over the network. The de-encapsulation process at the receiver parses the received packets, and feeds the information to the service controller and the client player.

The channel model 269 simulates indoor/home wireless environment and investigates error resilience of different video formats. There are many ways to model communication channels and develop appropriate multimedia transmission schemes. One typical channel model 269 used in such simulations is a combination of a packet erasure channel and binary symmetric channel (BSC). This channel model can describe situations where packets from a wireline network are sent to receivers over a wireless connection. Another commonly used channel model 269 for mobile communication is a flat-fading Rayleigh channel.

In order to reformat content in real-time, TVT-E 260 identifies the connected user device 180 in terms of display capability; available memory; CPU; and the player abilities and limitations (e.g.: can the player run flash or Java). TVT-E 260 also identifies the network that user device 180 is using to connect to ASN 150 and the type of content that is being sent to user device 180. The content can be, for example, a still image, multimedia objects, java objects, text, applets, or Ajax. TVT-E 260 then converts multimedia content to motion jpeg if user device 180 is unable to display multimedia content. TVT-E converts a long page to multiple decks of pages, with each page having a page number on the bottom. The objects are rearranged to fit the screen of user device 180. Pictorial objects are resized to the fit the screen layout. Audio files are converted to the format that is supported on user device 180. The size of the final output is then shrunk to fit the size of the user device 180, and user device 180 can then play the content.

In order to multiplex heterogeneous, or different, types of video content, TVT-E 260 receives native TV input in formats such as MPEG2, MPEG4, H264; decodes the stream to RAW picture frame; and converts the RAW picture frame to the RGB32 format. TVT-E 260 then identifies the type of connected user device 180 according to the screen layout of the device; the CPU of the device; and the player that the device uses. TVT-E 260 identifies the type of network the user device 180 is using to connect to ASN 150; identifies the user characteristics using UCC-E 230; extracts content from an open Internet or specific content database, such as an advertisement, or further information about the stream such as rating information about the stream; fetches a specific type of content that fits user characteristics and interest; overlays the fetched content to the RGB32 RAW picture, which TVT-E 260 has previously generated; encodes the new multiplexed stream supported by the user device 180 in, for example, MPEG2, MPEG4, or H264; and sends the new video stream to the user device 180.

TV Tuner Channel Control

Figure 12:
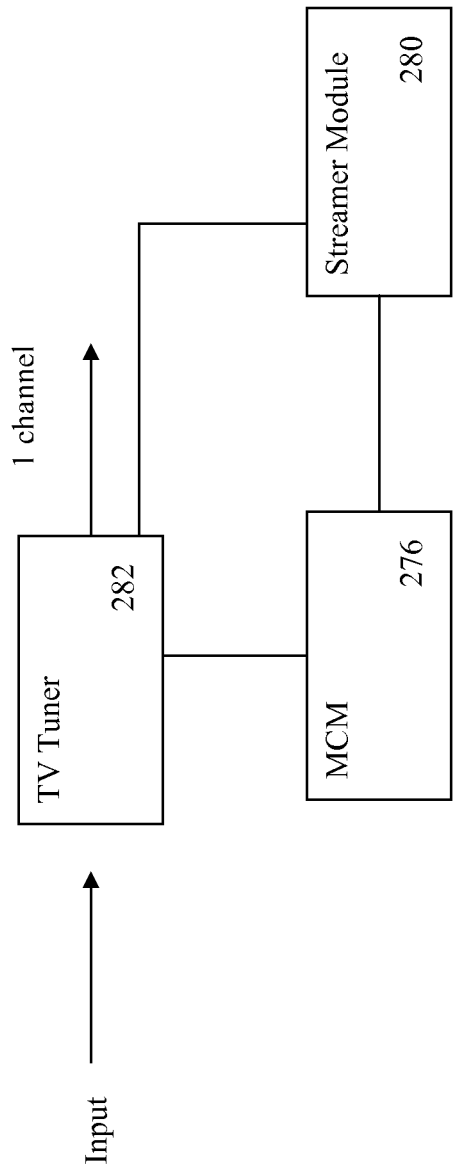
FIG. 12 is a block diagram showing an arrangement of the TV tuner and manage and control module within an ASN

As seen in FIG. 12, TV Tuner 282 hardware decodes one channel at a time. Therefore, if multiple users are watching a live channel, then manage & control module 276 identifies which user has control over which channel is being watched. As an example, if a particular channel is being watched by different users on a TV, a mobile device and a laptop, the user watching the TV may have control over which channel is being watched. Alternatively, the user who has control over the channel being watched may be the master account owner.

TV Tuner 282 receives commands from the Manage & Control Module (MCM) 276. MCM 276 acts as the remote control middleware. TV Tuner 282 produces one format of video output at a time, such as MPEG2 video, based on the commands received from MCM 276.

Streamer Module

Figure 13:
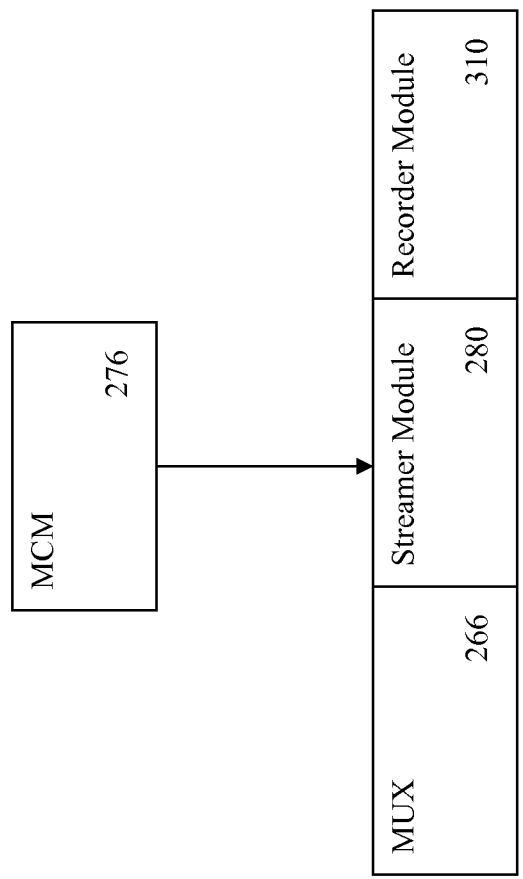
FIG. 13 is a schematic for a TV Transcoding Engine module (TVT-E).

Streamer module 280, depicted in FIGS. 13 and 15, is responsible for receiving requests to watch a channel from a user on any user device 180. However streamer module 280 knows if a TV is also currently being used to watch a channel.

Figure 16:
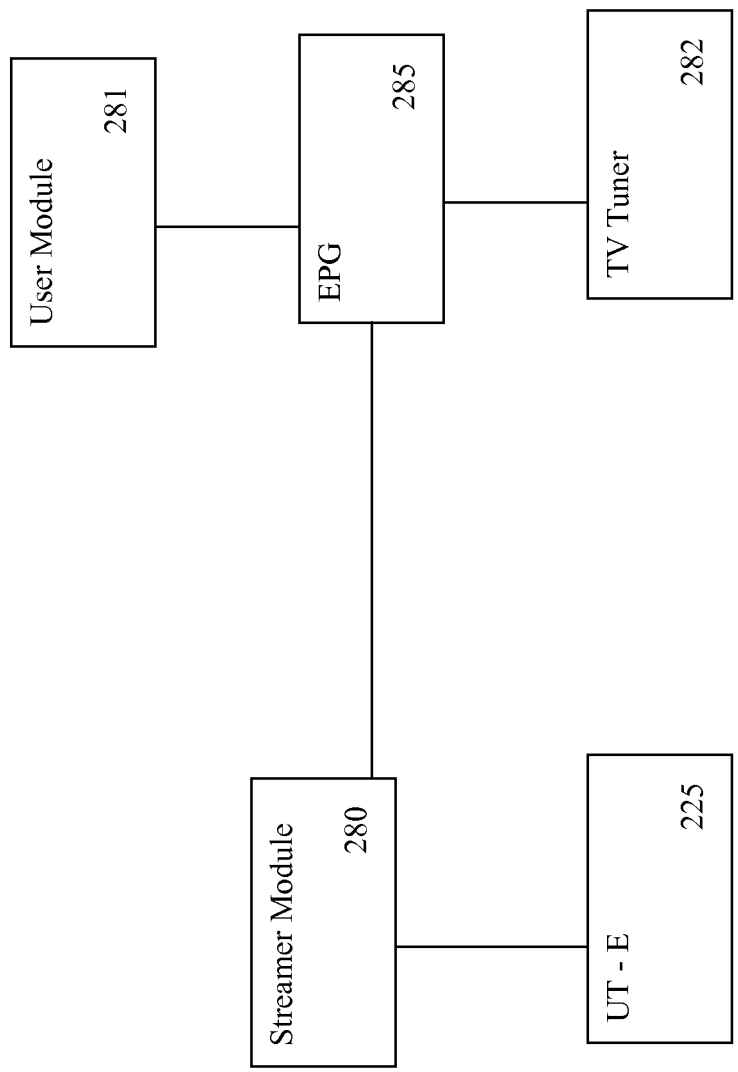
FIG. 16 is a block diagram showing the streamer module and associated modules.

Streamer module 280 may support a maximum number of users at a time, such as ten. Streamer module 280 interfaces with the components shown in FIG. 16. TV Tuner 282 is configured to receive MPEG2 formatted video; and User Tracking Engine 225 is configured to determine the type of user device 180 that a user uses and to identify the user, user device 180, and network context. The user module 281 is configured to receive commands to view a channel; change a channel; view a recorded program and/or view an Electronic Programming Guide (EPG) 285.

Figure 14:
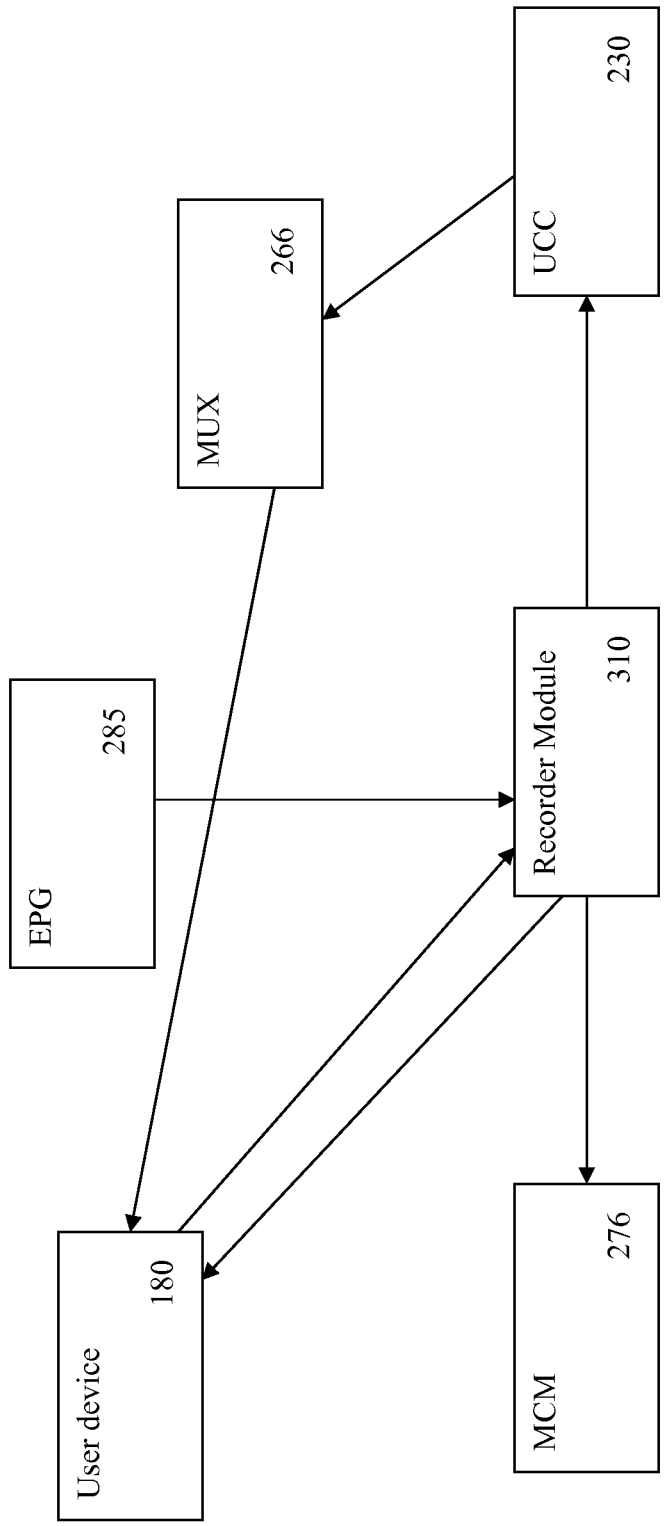
FIG. 14 is a schematic for a TVT-E and a User Content Characterization Engine to receive information about the user type and interests, and to multiplex the internet content with the TV or multimedia stream.
Figure 17:
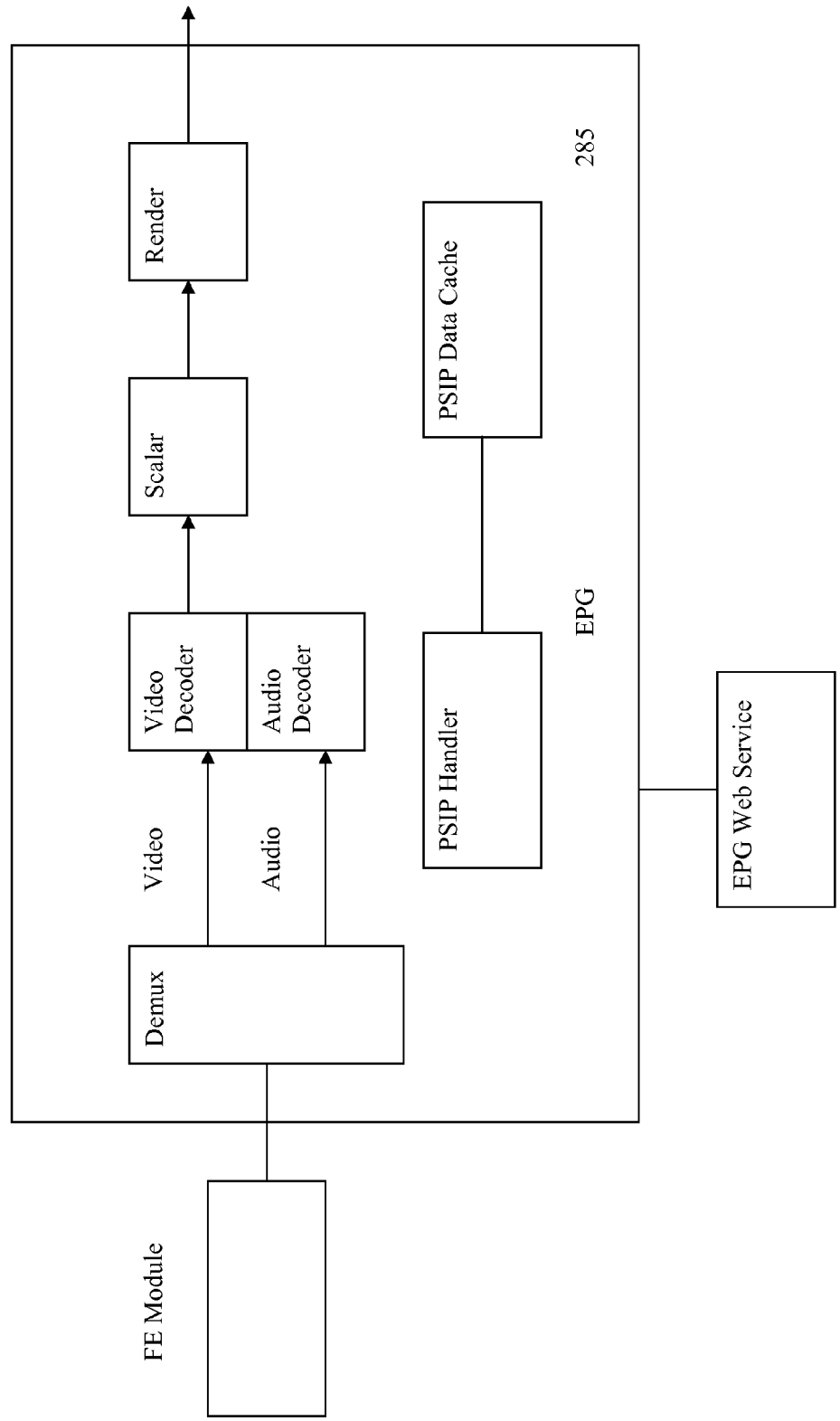
FIG. 17 is a schematic of software layer architecture for accessing the an electronic/interactive programming guide.

FIG. 17 depicts an embodiment of a software layer architecture that can be used to implement EPG 285. EPG 285 is an on-screen guide that allows users to select a channel and that provides program information about the programs on various channels. The TV stream can be received simultaneously from cable TV; DSP broadcast IP TV; cable (HFC) broadcast IPTV; DSL IP peer-to-peer IPTV; and cable (HFC) peer-to-peer IPTV using the streaming service as depicted in FIG. 14, to the format may be changed by another module to fit the user context such as: MPEG4; FLV; and/or 3GPP. The streaming module may also stream out the content to user devices 180, such as TV sets; and support RTSP transport layer protocol, and other protocols known to persons skilled in the art, to deliver content to the user devices 180.

Figure 18:
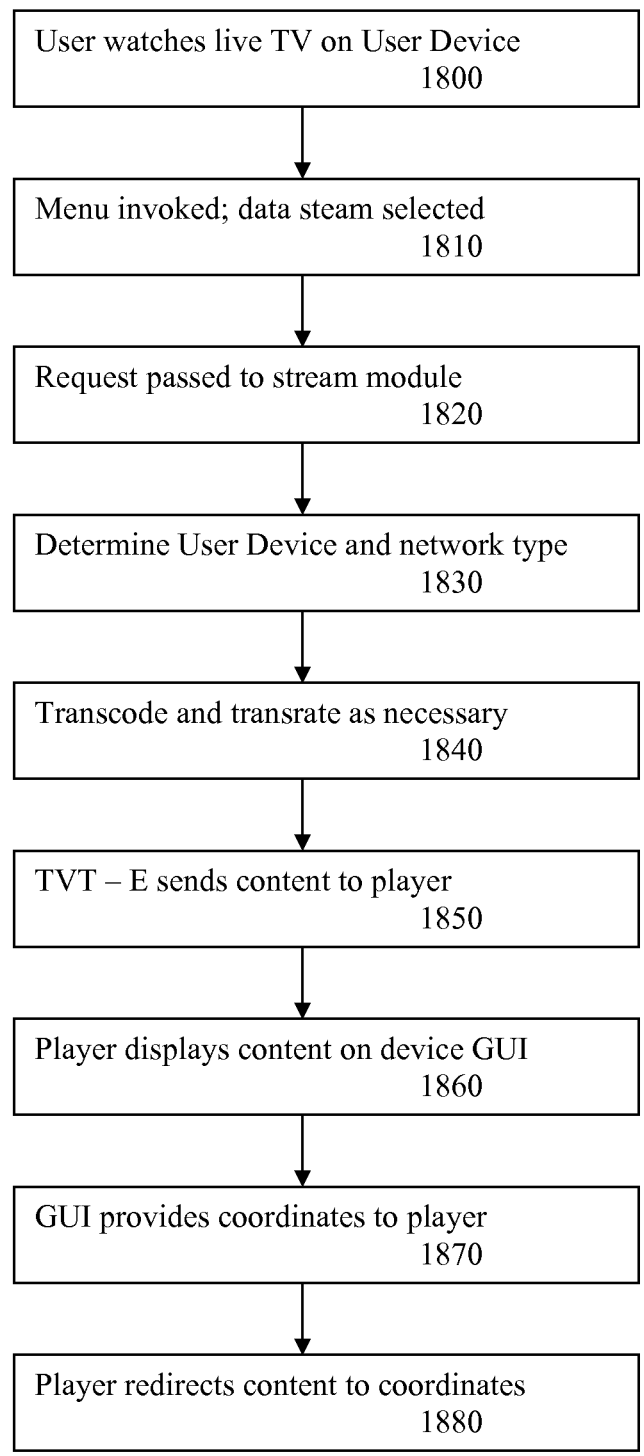
FIG. 18 is a flow chart showing the method by which the streamer module provides for additional TV inputs to be displayed on a user device.

Using the streamer module 280, multiple video streams from different sources can be displayed on the same display but on different areas of the display, as shown in FIG. 18. This can be done while also watching a live TV stream. This method can be implemented by first having the user watch a live TV stream on the user device 180 (step 1800). The user then invokes a menu and selects a data source (step 1810). The source may be, for example, any of: a live TV from another TV tuner (local or shared), a live camera stream, and the user's own ASN 150 or a different ASN 150 to which the user is connected (e.g.: an ASN 150 that forms part of a social networking group that includes the user). The user requests a particular content stream by making a menu selection. The user GUI receives the user's request, and passes the request to the streamer module 280 (step 1820). The streamer module 280 locates the video content, and may work with different modules that each act as a source of requested video. Streamer module 280 determines the type of user device 180 and the network type using the user tracker engine 225 (step 1830). Each source of video content provides streamer module 280 with its own content. Streamer module 280 requests one or both of transcoding and transrating from the TVT-E 260 as desired for video delivery to user device 180 (step 1840). TVT-E 260 pushes video content to the player of user device 180 that requested the content (step 1850). The content player notifies the user GUI on the user device 180 of the availability of the video content (step 1860). The user GUI splits the screen on which the content will be played and provides the coordinates (e.g.: in Cartesian coordinates) of each portion of the screen on which content will be displayed to the content player (step 1870). The content player then redirects the available content stream to the coordinates as provided by the user GUI (step 1880). The user then can view the video stream on the portion of the screen to which the content player has directed content. This can be repeated for different video streams, which allows different video streams to be simultaneously watched on different portions of the screen. The user may have audio enabled for one or more streams. The user may, for example, choose to only have audio enabled for a particular portion of the screen on which the user is focusing by selecting the window that occupies that portion of the screen.

Multiplexer (MUX) Module

Figure 19:
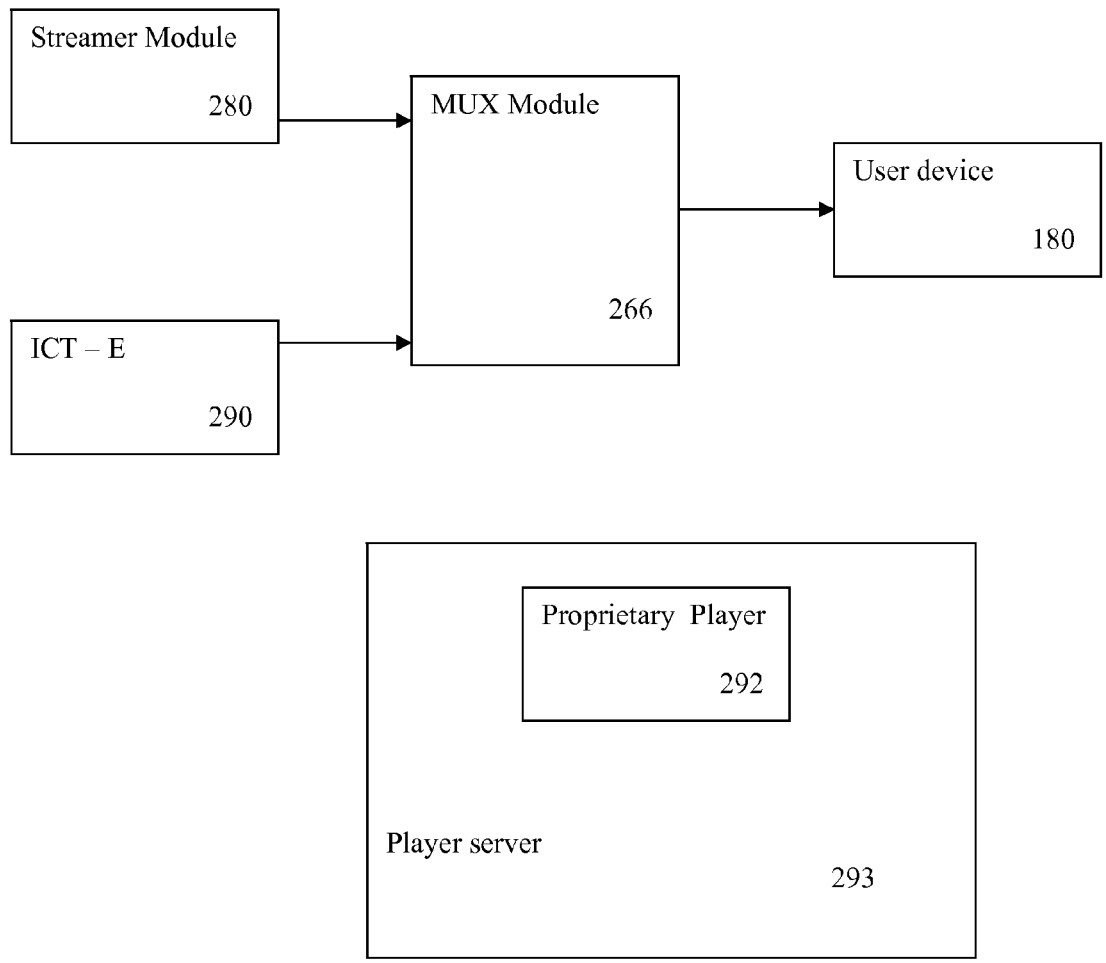
FIG. 19 is a block diagram showing the MUX module and related components.

As shown in FIG. 19, MUX module 266 is responsible for receiving internet content from Internet Content Transcoding Engine (ICT-E) 290 and streaming and multiplexing the received internet content to the same video output format as the streamer module 280 and pushing the content to the user device 180. Both the streamer module 280 and the ICT-E 290 need not be aware of MUX module 266. Streamer module 280 and ICT-E 290 send the content as if they were sending it to the end user, except the MUX module 266 intervenes, receives the content before the end user receives it, multiplexes the content to a single playable video frame, and pushes the content to user device 180. The benefit of this transparency is that any player which plays the format of the video content, e.g. MPEG4, can play the muxed content.

A proprietary player 292 can also be used. When a proprietary player 292 is used, a player server 293 can be used in place of the MUX module 266, or the MUX module 266 and the player server 293 can coexist, as shown in FIG. 19. Streamer module 280 and the ICT-E 290 remain unchanged. Notably, the ICT-E 290 is not a component of TVT-E 260.

Figure 20:
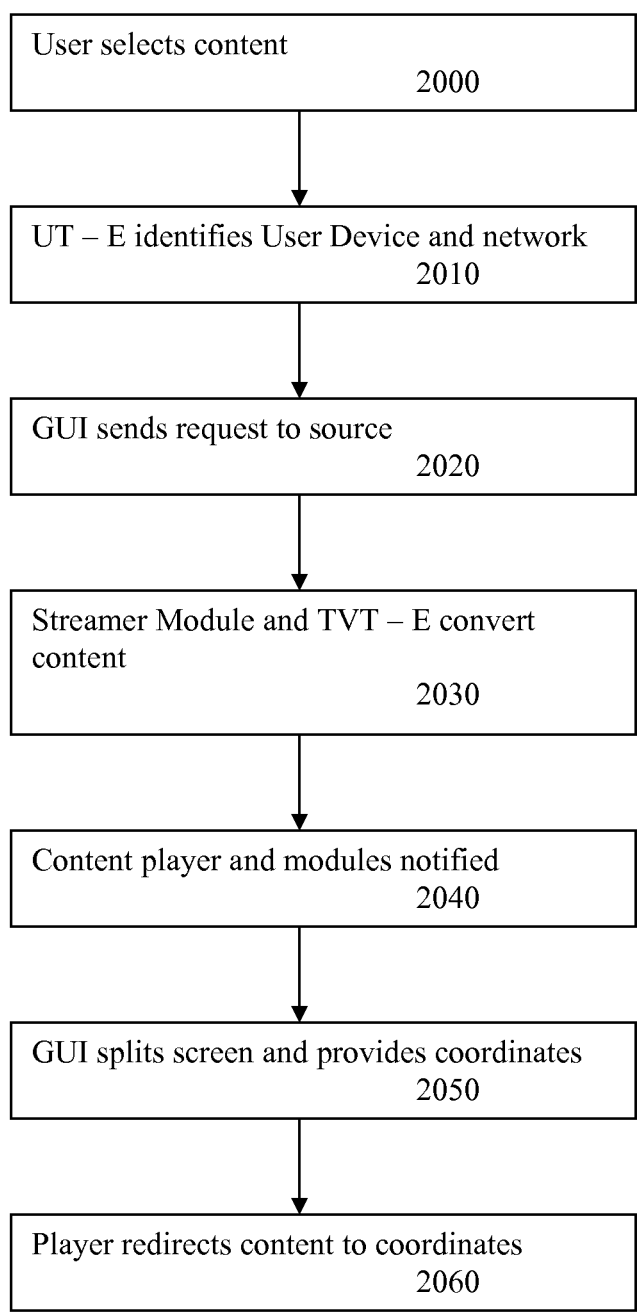
FIG. 20 is a flow chart showing the method by which multiple streams are displayed on a user device.

MUX module 266 can be used to allow the user to overlay and interact with content, even if that content is heterogeneous in nature (e.g.: content from a TV stream, a game console, and an Internet browser). As shown in FIG. 20, the user can first select using a menu which content to view (step 2000). The user device GUI receives the user request and interacts with UT-E 225 to identify the type of user device 180 and the network that the user is using (step 2010). The user device GUI sends the user request to the source of the desired content, and each content source requests such content from, for example, a suitable data stream (step 2020). Each content source interacts with streamer module 280 and TVT-E 260 independently. Streamer module 280 and the TVT-E 260 interact with UT-E 225 independently to identify user device 180 to which content will be sent and converts the content to suit user device 180 (e.g.: to be playable on the player that the user device uses, and to fit within the screen of the user device 180) (step 2030). Streamer module 280 and TVT-E 260 then notify the content player on user device 180 and any relevant modules of the availability of the content (step 2040). Each of the relevant modules then informs the user device GUI of the availability of the content. The user device GUI splits the screen on user device 180 and provides the coordinates (e.g.: in Cartesian form) of the portion of the screen on which content will be displayed to the content player and each of the container proxies (step 2050). The player and container proxies redirect available content to the coordinates that define the portion of the screen to which each should be sending their own content (2060). The user is consequently able to view all the different types of content on one screen of the user device 180, with each type of content being displayed on one portion of the screen. The user can interact with each type of content by selecting the portion of the screen displaying the content using any suitable means for data entry, for example by using a control device, such as a remote control, mouse, keyboard, or joystick.

Figure 21:
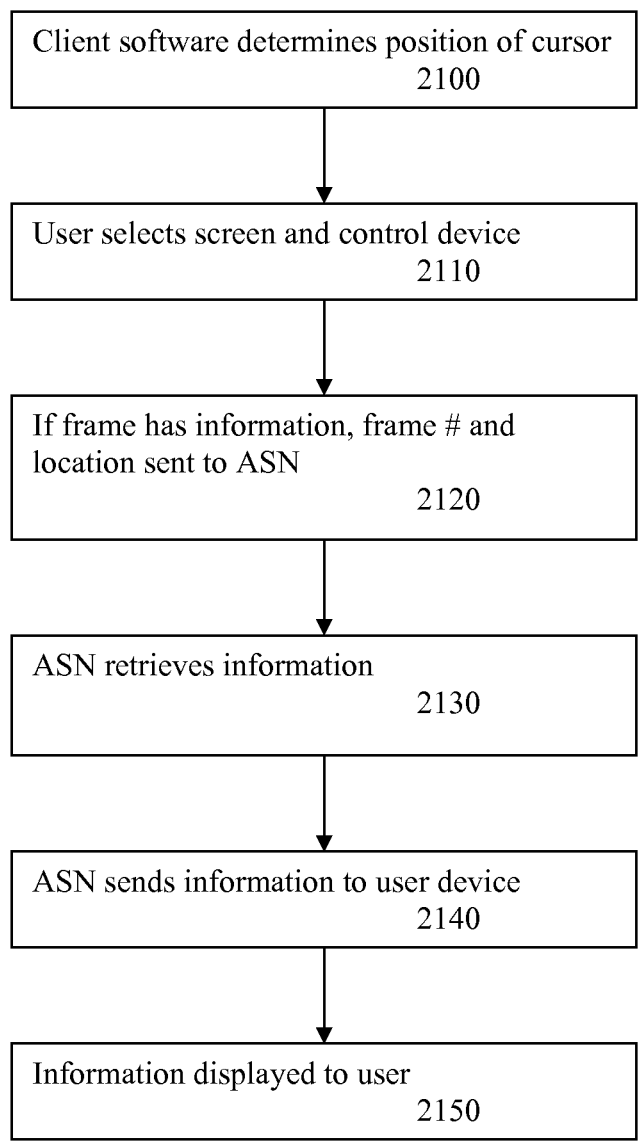
FIG. 21 is a flow chart showing the method by which a user can interact with a display.

When multiple content streams are simultaneously displayed on different portions of the screen of user device 180 at once, the user may click on and extract information from any one of the different portions of the screen as follows and as shown in FIG. 21. Client software installed on the user device 180 can determine the position of a cursor on the screen when the screen is displaying content streamed from ASN 150 (step 2100). The stream that is sent to user device 180 contains a frame sequence number. Each frame of content contains Cartesian pixel coordinates and is flagged if the frame contains information that the user may extract. While playing on the user device 180, the user may select a portion of the screen (e.g.: by clicking the screen with the cursor or touching the screen if the screen is touch sensitive) (step 2110). If the frame that is selected is flagged such that it contains extractable information, the user device 180 will transmit the frame number and location on the screen that was selected to the ASN 150 (step 2120). ASN 150 checks the position and retrieves the extractable information associated with the clicked or touched location on the screen of the frame sequence number (step 2130). ASN 150 sends the extractable information to user device 180 (step 2140), which consequently displays the now extracted information to the user (step 2150). The information can be in any suitable format, such as text, still image, video, or audio.

Recorder Module

Recorder module 310, as seen in FIG. 14, receives recording requests from the user and records on behalf of the user. Once the file is recorded streamer module 280 streams the media out to the user, based on user context. However, if the user is using the local TV set to view the file, then the file will be played. Streaming a file, as opposed to transferring the entirety of the file, may be required due to digital rights issues. In order to stream the file, the file format must be converted to a format that the user device 180 can view and then streamed to the user device.

Content Access by Proximity (CAP)

Figure 22:
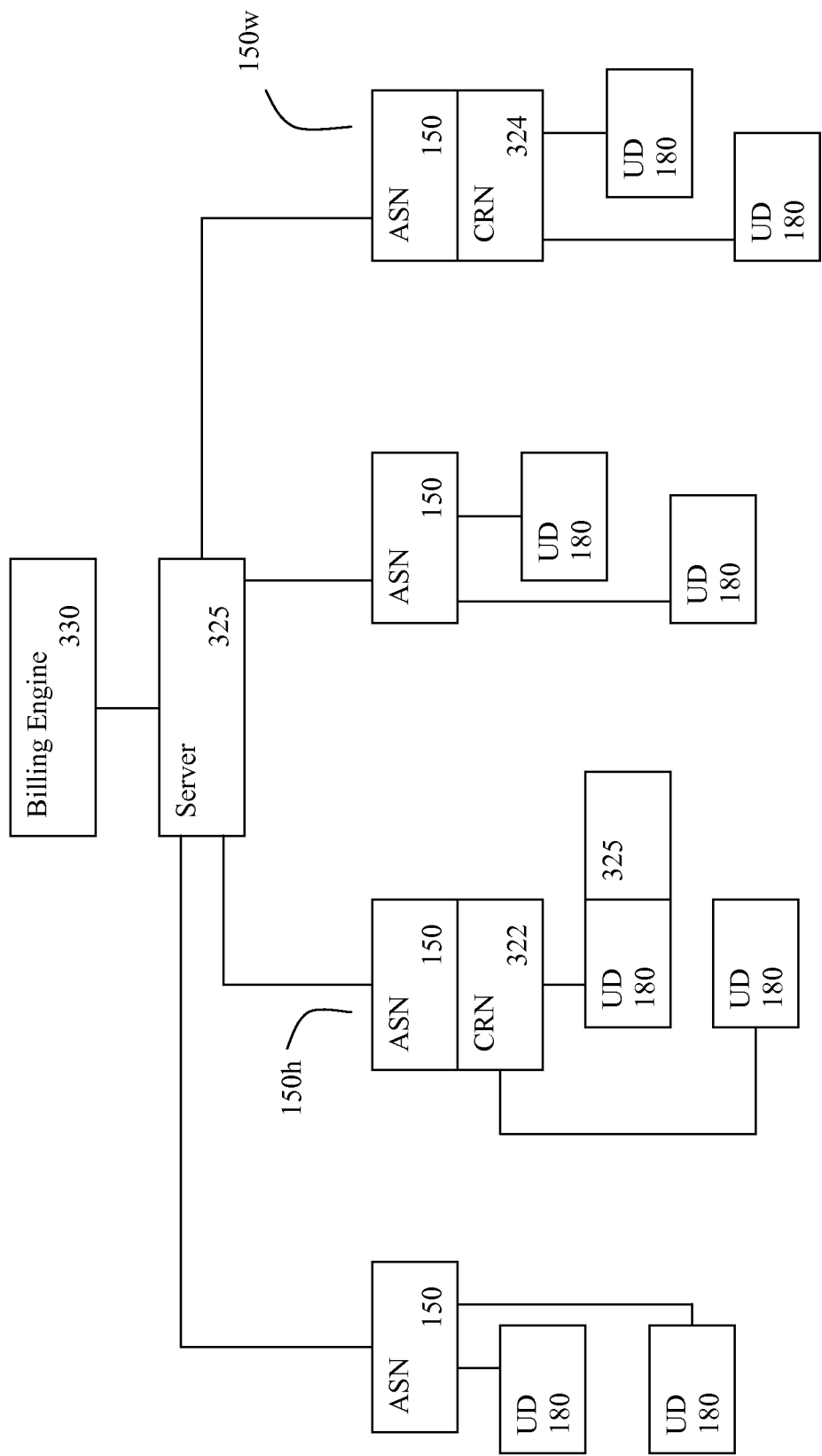
FIG. 22 is a system diagram showing a CRN and CON.

Content Access by Proximity module 320 is responsible for route optimization and CAP. For example, and as shown in FIG. 22, when one user is registered and requests access to content, the content source is the ASN 150 that is closest in proximity to a content requester node ("CRN") 322 in a peer-to-peer ("P2P") model. CRN 322 may be any node in the network that requests content, such as ASN 150 or one of the user devices 180. The ASN 150 that is "closest in proximity" to CRN 322 is the ASN 150 from which data can take the shortest or otherwise optimum path to CRN 322 in terms of number of routers through which data has to pass, taking into account the load of each router. This enables network users to be significantly self-sufficient and self-reliant because they do not require use of a conventional centralized server that provides content to users located along the edge of the network. The architecture according to an embodiment of the present disclosure facilitates a content sharing network in a distributed model where users access content from their closest peer in order to prevent delay and save backhaul bandwidth. The access could be for sharing, for example, a TV-Tuner stream, recorded content, a file, data, image, audio, video, online chatting and gaming.

This method enables nodes at the edge of the network to cooperate together in a decentralized manner. Hence, each ASN 150 also acts as a router and forwards traffic destined for other peers, which includes other ASNs 150 and other user devices 180. The participating nodes act as both servers and clients simultaneously and provide and share resources such as bandwidth, memory, and computing power. This architecture mitigates the risk of a central point of failure. The ASNs 150 are nodes of networks distributed among the participating peers. Content and services are provided by multiple nodes at different locations in the network.

CAP module 320 combined with the micro-cloud architecture provides the following benefits. CRN 322 achieves the best performance by efficiently and fairly utilizing network resources. Network providers achieve efficient and fair usage of their resources in order to satisfy the CRN 322 requirements. Download performance is enhanced while simultaneously reducing network congestion. CRN 322 receives content from the closest peers, instead of selecting peers randomly, so that the transit cost is minimized while data transfer speed is maximized. Efficient traffic flow is provided between the application executing on ASN 150 and the network providers.

Network topology information is used by CAP module 320 to enable CAP. Network topology information may be based on Content discovery (determining which nodes, such as the ASNs 150, have the requested content) and/or Comparison Path Analysis (CPA) between each node with available content to the node requesting the content. This includes the characteristics of nodes and the path between the nodes, which includes but is not limited to the load on the Content Owner Node (CON) 324, which may be an ASN 150; the available bandwidth (uplink and downlink) to the CON 324; the available bandwidth (uplink and downlink) to the CRN 322; the available bandwidth between each CON 324 and the CRN 322; the path distance between each CON 324 and the CRN 322; the number of nodes between each CON 324 and the CRN 322; the characteristics of each node, such as what network the node is connected to and which user devices are connected to the node; and/or the policy of each node in terms of service priority. A list entry of the list for path identification is available statically and can be modified or added dynamically; therefore the list can be extended as new characteristics become available that are taken into account for path analysis decision making.

Figure 23:
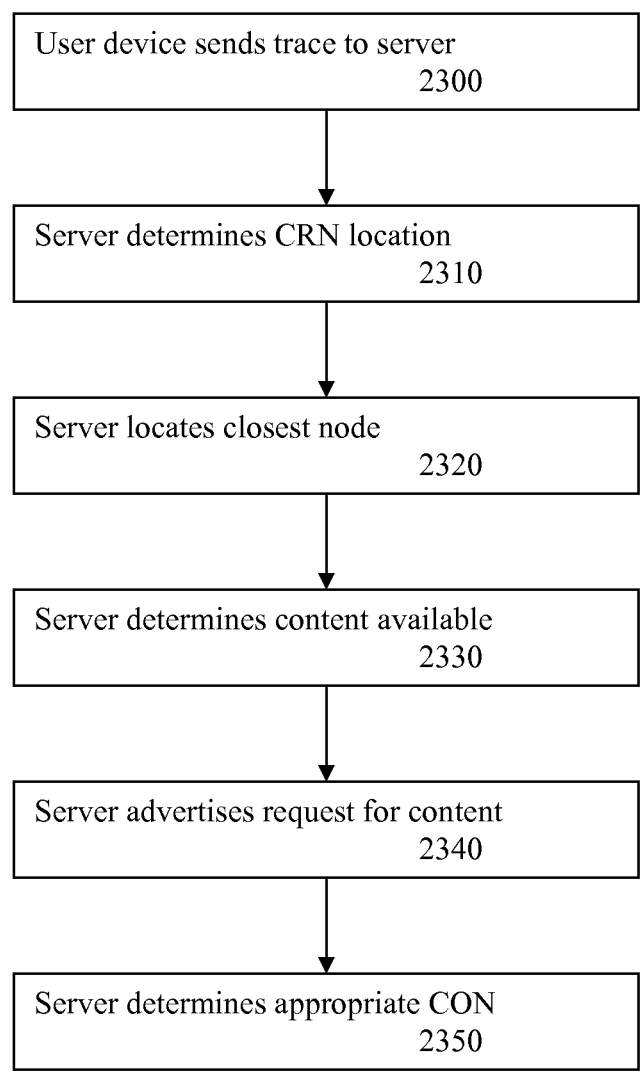
FIG. 23 is a flow chart showing the method by which a server facilitates communications between and CRN and CON.

As shown in FIG. 23, a server 325 operated by an operator are other entity and that is connected with the network policy and ordering system that is used for authorization, authentication and accounting is also used to determine the whereabouts of the CON(s) 324 and CRN 322. Server 325 contains the network topology data from ISPs and provides this information to ASN 150. There is a client application 328 running on the user device 180 that sends a trace to the server 325 along with optional GPS location information (step 2300). The server 325 at this time uses the location information from the client 328 and estimates the distance through the trace information in order to determine the CRN 322 location (step 2310). The server 325 then determines the closest router to the client 328 and maps that against the network topology (step 2320). The server 325 then determines what content that CRN 322 is requesting (step 2330). The server 325 contains the reference to the content. The server 325 then advertises the request for available content to all servers within different regions (step 2340). The response for available content will come from the servers that have the content available within the ASN 150 or user device 180. Server 325 then goes through the CPA process and based on its findings it will redirect the request from the CRN 322 to the CON 324 with closest proximity and which is most suitable to the condition of the CRN 322. Alternatively, server 325 may not be necessary, and the ASN 150 which is CRN 322 can request the content from other ASNs, particularly if the requesting user device 180 is not proximate to the ASN 150 to which it is registered.

In an alternative embodiment, all servers advertise the availability of the content to each other and on a regular basis as new content becomes available to one of the ASNs 150 or CONs 324. In this alternative embodiment, all servers utilize reference pointers to, and do not store physical copies of, the content information and its location at the server. Therefore when a CRN 322 receives the information from a server which has received the request, the CRN 322 knows which region contains the content and therefore immediately forwards the request to the server responsible for that region.

In both of the above embodiments, if the connection between the CRN 322 and CON 324 is not adequate for streaming the content may be copied to server 325 or to the CRN. The content will remain and be cached for a period of time, which is defined by dynamically updated rules and policy database from the operators. These rules could also depend on the popularity of the content. The content is either personal content for which the rating is dependent on the frequency with which the content is being requested and therefore the rating dynamically changes as more requests are made or is third-party owned content that has a static, unchanging rating that has been previously assigned. Under certain circumstances and based on type of content, multiple CONs 324 may work together to each send a portion of content to the CRN 322. This would by defined by the policy and advantageously allows the CRN 322 to download content quickly.

Once the CON 324 is identified, server 325 will not be involved, but direct communication will be initiated and continued until the content has been transferred. The CRN 322 may send a variety of different messages to the server 325; for example, the messages may indicate success, pending, failure in order to notify it of the status of the process. The server 325 is responsible for applying any charging rules for the content sharing and for sending the result of the application of such rules to the billing engine 330.

In comparison to conventional P2P models, the above embodiments reduce the number of routers or hops that traffic traverses in order to reach its destination, the user device. On average, P2P traffic makes 5.5 hops to get to its destination. The same request will be reduced to an average of 0.89 hops with the foregoing embodiment. This architecture also reduces the transit cost by minimizing the amount of traffic that flows in and out of ISPs network. This module helps CRN 322 to efficiently access the content from the participating peers which affects the speed tremendously and facilitates effective network utilization.

In order to access content by proximity, a user device 180 makes a request for content from the home-ASN 150h, which is the ASN 150 to which the user and user device 180 are registered. The home ASN 150h passes the location information of the user device 180 along with the request to the server 325 that resides within the network. The server 325 has the information about which ASNs 150 around the network contain the content that the home-ASN 150h is requesting. The server contains the location information of the home-ASN 150h. The server calculates the closest path to the closest visitor ASN 150v that contains the information. The visitor-ASN 150v is an ASN 150 to which the user device 180 that made the original request is not registered. The server 325 sends a request for direct content distribution to the visitor-ASN 150v along with the location and access address of the home-ASN 150h. The server 325 sends the notification to the home-ASN 150h of the location and access address of the visitor-ASN 150v. The notification message informs the home-ASN 150h that the visitor-ASN 150v will send the content. The home-ASN 150h may send notification to both the user device 180 and the visitor-ASN 150v that both nodes have the permission to communicate directly. The home-ASN 150h may accept receiving content from the visitor-ASN 150v and redirect the content itself to the user device 180 which made the original request. The home-ASN 150h notifies the server 325 of the status of content delivery to the user device 180. If the visitor-ASN 150v transmission is interrupted, the home-ASN 150h notifies the server 325 of the time and location of the interruption. The server 325 may then take control of the transmission and send the content to the home-ASN 150h itself. Under certain circumstances the server 325 may send a request to multiple visitor-ASNs 150v for content distribution task sharing. The server 325 sends each visitor-ASN 150v a request along with the position and time at which it wants each visitor-ASN 150v to send the content to the home-ASN 150h or to the user device 180 directly. The server 325 in this case sends a request to the user device 180 and home-ASN 150h to inform them of the visitor-ASN 150v authentication information for security purposes and key exchange.

GPS Assisted Automatic Bit Rate (ABR) Control Module

ABR module 340 is responsible for controlling the transmission of content in such a way that it is best suitable to the condition of the user device 180. ABR module 340 may use GPS information sent by the user device 180 requesting content. GPS not only calculates the location of user device 180, but it contains the information such as speed and elevation of the user device 180 (e.g.: if the user is using the user device 180 while in a moving automobile, the GPS information includes the automobile velocity) and the location of connected Base Station 342. Speed of the user device 180 is important because it identifies the expected error rate and frequency of possible cell switches with resulting delay and expected packet loss rate. The elevation information provides intelligence about the geographic environment of user device 180 which enables predicting of a possible multi-path effect open or mountain areas. The location information also enables determination of which server 325 is closest to the user device 180, so that content can be pushed from the closest server 325. Based on this information ABR module 340 determines the best and most accurate transmission rate of content to user device 180. ABR module 340 in this case dynamically and per frame decides the most suitable: frame resolution; packet size; transmission interval; the number of frames per second; and the expected packet arrival rate, which can be determined from the actual packet arrival rate as measured over a given period of time.

The result is then applied to the application layer and transport layer protocol that is being used natively by supported player running on the user device 180. Additionally, based on the location of the CON node the CDN 15 decides whether it should continue serving or transfer the serving to another CDN 15 that is closest to the user device 180.

In order to implement GPS assisted ABR control, the user device 180 is equipped with GPS capability. The user device 180 contains a GPS client application 344 that reads the GPS coordinates and differential coordinates. GPS client application 344 sends this information to the server 325. The server 325 receives this information and calculates the speed of the user device 180, which corresponds to a vehicular speed if the user device 180 is traveling in a vehicle. The speed provides an entry point parameter for measuring the possible data transmission error rate and packet loss. The server 325 adjusts the content transmission bit rate to the user device 180 based on estimated error rate and packet loss.

Automatic Bit Rate (ABR) Control Module

ABR module 340 is responsible for controlling the transmission of content, such as multimedia in such way that is best suited to the condition of the user device 180; "condition" includes the CPU, supported content formats, transport layer protocol, and other user device 180 characteristics and abilities. However, ABR module 340 acts as a container responsible to support third-party ABR modules/libraries/protocols dynamically on ASN 150. The advantage is support of wider device types, players and available ABRs that are deployed by operators and other entities. When user device 180 connects and request content, ABR module 340 detects the type of supported ABR and using that information executes the third party ABR. If the executable ABR is not available on the ASN 150, the ABR module 340 requests that a server download the executable, install and run it automatically and start supporting the ABR based transmission of the content.

Interactivity Module

Interactivity module 360 provides a method of interacting with any keyboard-less screen of a user device 180s through ASN 150 by utilizing a keyboard enabled user device 180k, for example a laptop or smart phone. This is done by invoking interactivity module 360 that resides on the ASN 150. A user device 180k with a keyboard and mouse invokes interactivity module 360 and sees a virtual keyboard and mouse open on the user device 180s' display. The user then hits the keyboard enabled user device 180k's touch screen or hard keyboard, which invokes the action on the virtual keyboard sent to the ASN 150 and which action is performed on the keyboard and mouse less user device 180s screen (e.g.: on a TV set). The transfer of the information (keyboard and mouse action) from the keyboard and mouse enabled user device 180k to the ASN is accomplished through one or more of, for example, Bluetooth, IRDA, HTTP, DLNA, and femtocell. This interface allows the user to use user devices 180 as the keyboard and mouse to interact with ASN 150 and ultimately with a user device 180s, such as a TV display when a browser is open. Anything that the user types on the virtual keyboard is also typed on the TV set or any other connected screen. The user moves the virtual mouse to guide the cursor to the right position on the TV display or any other display. This portal provides full keyboard and mouse functionality.

To interact with a user device 180s, such as a TV display, through a user device 180k, such as a mobile device by utilizing the keyboard and mouse of the mobile device, ASN 150 is configured to have a web portal/website that presents a keyboard and mouse visually to the user. The user uses his or her user device 180k, such as the mobile device and connects to the ASN 150 website using any suitable form of network available to it (e.g.: Wi-Fi, Bluetooth, cellular network technology, WiMax, DLNA). The user is then presented with the full keyboard and mouse interface fit to the screen of the user device 180k, such as the mobile device. The user uses the web-based keyboard and mouse to type, move and interact with the browser, game, or TV menus on the user device 180s, such as the TV display.

Personalized Account Interface Module

Personalized Account Interface Module 370 allows the user to setup a preferred layout and theme on ASN 150. The user selects a favourite theme in terms of the location of the following on a user device 180, such as a TV screen: TV Stream; Internet web content; and Favourites. Such favourites include favourite: channels; RSS feeds; pictures; shows; full layout theme; and any other customized list.

These settings are saved in ASN database 165 and every time the user accesses his or her account this personalized interface is invoked and is presented to the user. The same interface is available regardless of what type of user device 180 the user utilizes to access content (e.g.: a mobile device, laptop computer, or desktop computer). The user can, however, change the entire or partial layout that is displayed on any of the different user devices 180 the user relies on the access content. This information is also stored in the database and every time the user accesses content via ASN 150, depending on which user device 180 the user is using, the theme that is presented to the user is customized. This method is accomplished through a series of portal and web interfaces on ASN 150 enabling user's full configuration. This configuration can be saved, edited, changed and removed remotely and through any user device 180.

Video Time Tagging Module

Video time tagging module 380 enables tagging of content, such as a clip excerpted from a multimedia content file that is either live or recorded and from TV or any other digital media source and storing it as a clip instead of storing the entire file. Video time tagging module 380 can be called by any user connected to the ASN 150 via any type of user device 180. Once the user selects a point on the screen by either pressing a button, or selecting a portion of the screen, the user is presented with an interface that prompts the user to select the start time of the tagged clip. Then this tagged clip is recorded on the database 165 for the user. The user has the option of sending the tagged clip to another user device 180 or to another user. The user has the ability to view the tagged content on his/her own list of favourite tagged content. Once another user device 180 or any other CRN accesses the tagged clip and requests to view it, conversion module 268 converts the format to the most suitable format for the new user device 180 dynamically and in real time.

In order to video time tag by inserting a time stamp on a portion of real time video or a recorded stream of video, the user first selects a scene in the video by pressing a button on a user device 180, such as a remote control or a key on a keyboard or soft (virtual) keyboard. The ASN 150 receives this request for a time tag. The ASN 150 inserts a pointer reference to the frame sequence number. The ASN 150 optionally invokes a menu prompting the user to select the start point as the selected time (Stsl) or a period of time before the selected point (Stsl−StΔsl). The ASN 150 may invoke a menu asking the user to select the end point as the selected time or a period of time after the selected point (Etsl−EtΔsl). If St equals Et then only one frame is kept for the reference to the pointer. When the user browses the video tag or requests the video tag, the ASN 150 jumps to the tagged time. If there is a tag reference on a recorded stream that the user has instructed the ASN 150 to delete, the ASN 150 invokes a menu to prompt the user whether the tagged portion of the recorded stream is to be deleted. If the user selects no, then the tagged time frames are not deleted even though the remainder of the recorded stream is. If the stream is a live stream, when the user requests a tag then the tagged time frame will be recorded in a tag database for that particular user. When the user requests to view the tagged frame, the ASN 150 reformats the content in the stream as required and then transcodes and transrates it using TVT-E 260 prior to transmission, if necessary. Tagged frames can constitute content of various time periods; for example, anywhere from one second to multiple hours. Tags are visually presented to the user in a timeline and picture frames are associated with the timeline. The user may create an album of "favourites" from a selection of tagged frames belonging to one original stream or multiple, different streams. For example, an album could constitute a series of tagged frames from different recorded basketball games. The user can navigate through tagged frames by selecting a specific tagged frame, or by skipping forward through a series of tagged frames one by one until the user selects one particular frame to view, and can also skip backwards through a series of tagged frames one by one until selecting a particular frame to view. The user can search tagged video using a variety of parameters; for example, by name, date and within a time period. The user also has the option of deleting or archiving tagged frames, albums, and series.

Content Follower Module

Content follower module 390 enables the user to transition watching content from one user device 180 to another user device 180. For example, when the user watches content on a TV display and stops watching the content, as soon as the user connects a second user device 180 to ASN 150 the user is presented by an interface asking whether the user wants to continue watching the content on the second device. If the user selects to continue watching then TVT-E 260 converts the format of the content accordingly and transcodes and/or transrates the content as needed to the most suitable format and condition for the second user device 180.

Figure 24:
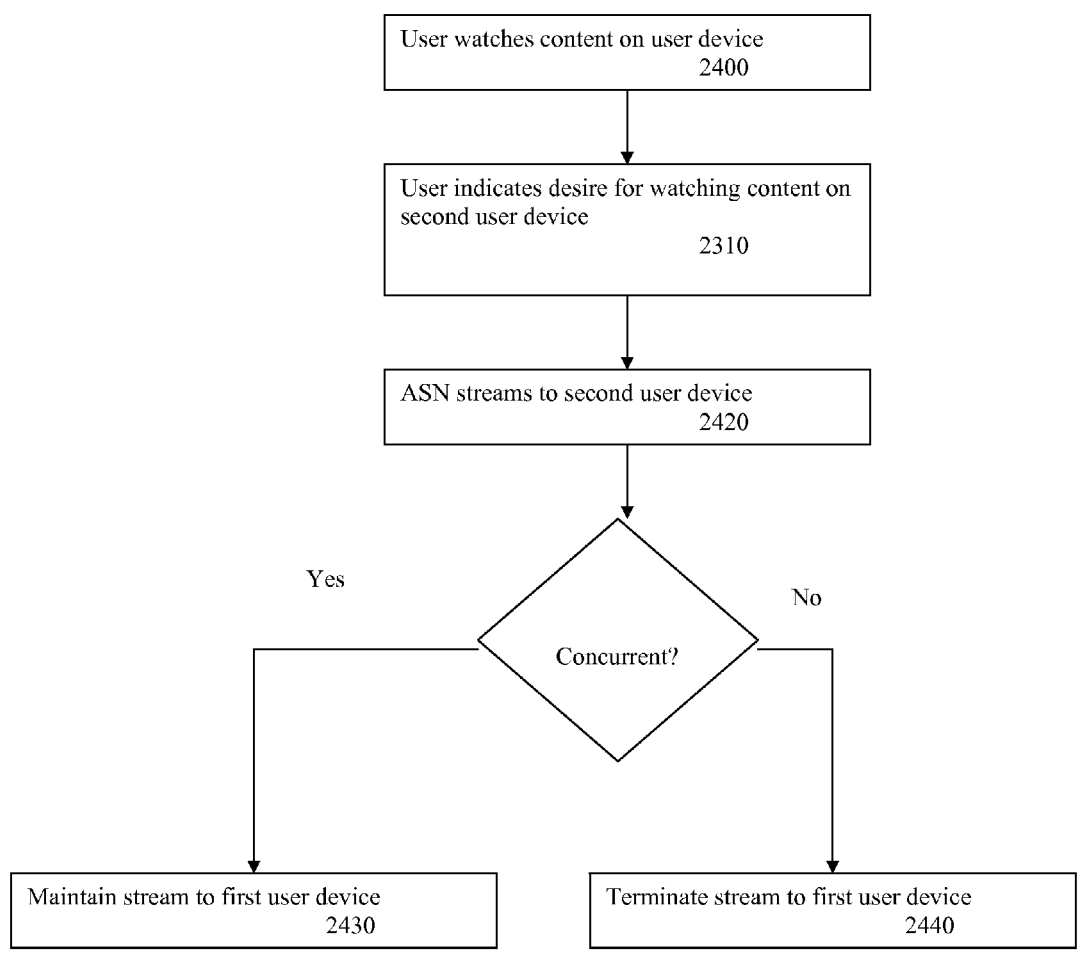
FIG. 24 is a flow chart showing the method by which content continuity is achieved.

To implement this functionality, deemed "content continuity" across multiple user devices and networks, as shown in FIG. 24, the user first connects to the ASN 150 by virtue of experiencing content, for example in the form of a video stream on a user device 180 at home; the user device 180 may be, for example a TV set or computer within the home (step 2400). The user then selects a menu option indicating that he would like to continue watching the video stream on a second user device 180 at home (step 2410); the video stream may concurrently be sent to the original user device 180 ("concurrent display" option) or may only be sent to the second user device 180 that the user wishes to use ("stop and continue" option). The ASN 150 then streams the video stream to the second user device 180 that the user has selected (step 2420). The ASN 150 will stream video to both the original and new user devices 180 if the user selected the "concurrent display" option (step 2430), or stream only to the new user device 180 (step 2440) if the user selected the "stop and continue" option. The ASN 150 reformats, transcodes, and transrates the video stream as required as described previously.

Context Collection Module

Context collection module 410 collects all users' activities using the ASN 150 and also captures ASN 150 activity itself. By "ASN activity itself", it is meant as any activity initiated by the internal modules of the ASN 150 or by a user requesting something of the ASN 150. The registered users' activities include anything for collecting usage information related to TV and Internet. For example, context collection module 410 provides accurate information that enables operators to determine whether a user is watching a TV channel or is just browsing through different channels and if the user switches channels while advertisements are being played. This is achieved through implementing Deep Content Inspection functionality, a method of inspecting content that is known to skilled persons, in conjunction with the User Content Characterization Engine (UCC-E) 230. The ASN 150 handles all registered users' traffic, and as it relates to Internet access the context collection module 410 maintains a snapshot of all users' activities. This allows the context collection module 410 to get accurate information in areas such as what Internet content that the user viewed using an Internet browser and was most interested in.

The information that the context collection module 410 collects may include the following. For television (TV), the information collected may include the channel(s) watched; the start time; end time; program information; user information; user device 180 information used to watch; information of the user device 180 supported/native player on the user device; native player protocol; the ABR used; network connectivity (e.g.: cellular network, wired broadband connection); whether the user recorded the program; and/or whether the user created a video tag. Additionally/alternatively, information about Quality of Experience (QoE) may be collected, such whether delay was experienced and/or the number of packets lost or duplicated.

For the recorded program, the information collected may include the name of the program or program ID; the start time; the end time; if the program was finished or paused; how may times was the program was paused; how many times the user skipped through portions of the program; the program minute at which it was skipped; the program minute at which "Play" was pressed to end skipping and resume normal program viewing; if the user rated the program and/or whether the user created a video tag. Other information of the recorded program that is collected may include the User ID; User Device 180 ID; User device 180 supported/native player on user device 180; Native player protocol; ABR used; Network ID; the number of times the recorded program was watched; whether the program was shared, and if so, the information and characteristics of who it was shared with, such as User ID; User Device 180 ID; Network ID; date; start time; and/or end time. Additionally/alternatively, information about Quality of Experience (QoE) may be collected, such whether delay was experienced and/or the number of packets lost or duplicated.

For internet applications, the information collected may include the URL; Session ID; Session Start time; Session End time; whether the user entered the URL; whether the user referred to the URL by a hyperlink on another website; content available on the site; what content within the site the user clicked-on; User ID; User Device 180 ID; and/or Network ID. Additionally/alternatively, information about Quality of Experience (QoE) may be collected, such whether delay was experienced and/or the number of packets lost or duplicated.

For internet applications, the information collected may include Personal Content and/or type of content. Types of content include images; videos; music; and file information. Other information may include the Session Start time; Session End time; User ID; User Device 180 ID; and/or Network ID. Additionally/alternatively, information about Quality of Experience (QoE) may be collected, such whether delay was experienced and/or the number of packets lost or duplicated.

To collect user context information, each ASN 150 handles all traffic of a group of users registered at a premise and for each of the user's multiple user devices 180 over different access networks such as Wi-Fi, Ethernet, Broadband (includes wireless mobile, 3G, and 4G; WiMax; Fast DSL; and HFC). Every user's traffic stream passes through the ASN 150. The ASN 150 collects the context information and processes it either in real time or saves it for post processing. The ASN 150's context collection module 410 passes each stream through deep packet inspection, deep content inspection, and content filtering for separating content sent from "static main" URLs vs. content sent from a "crawler" URL. The context collection module 410 posts the usage to a data depository in the network along with information such as a detailed user ID, user device 180 ID, network ID, content type, start time, end time. A user device 180, such as a mobile device keyboard and mouse may act as inputs for the interactivity module.

Neighbouring TV Sharing (NTVS) Module

Each ASN 150 has a number, N, of TV tuners. One TV tuner ($N_1$) is used to watch one live channel and the other tuners ($N_2, N_3, \ldots$) are used to record other channels. The NTVS module 420 allows for three types of activity.

One type of activity is to store and forward in real-time the content received by recording tuners ($N_2, N_3, \ldots$) to registered user devices 180 that are actively also watching other channels whether these user devices are at home or outside, whilst allowing the recording of the same content at the same time as well. This would eliminate the limitation of actively watching multiple channels at the same time.

Another type of activity is when all available TV Tuners are actively used, this module sends a message to server 325 and requests, from an available tuner in another ASN 150, specific content such as a TV channel or VoD. The server then finds the ASN 150 within the closest proximity that is watching the requested channel. The server then enables the ASNs 150 (both the ASN 150 requesting content and the ASN 150 that is hosting content) to exchange information. The NTVS module 420 from the host ASN 150 then starts sending the video stream to the NTVS module 420 at the ASN 150 requesting content. The NTVS module 420 at the requesting ASN 150 then distributes the content to user devices 180 at home.

Another type of activity is when the NTTV module 420 may also request resource sharing, which means that if the NTVS module 420 at the requesting ASN 150 lacks the CPU power to transcode and transrate the received content it may ask the NTVS module 420 at the host ASN 150 to transmit the content from the channel in a specific format. This means that the NTVS module 420 at the host ASN 150 uses its CPU and resources to transcode the received stream from a local TV tuner to a specific format before transmitting the stream to the NTVS module 420 at the requesting ASN 150. The NTVS module 420 at the requesting ASN 150 then pushes the incoming stream from the Network Interface Card (NIC) connection to a user device 180.

In all three cases, the incoming stream can be distributed and viewed on a user device 180, such as a local TV display that is watching another live channel in Picture-in-Picture format. The received stream from the NTVS module 420 on the host ASN 150 is shown as a small window on the display of the local TV tuner. The user device 180 can be a laptop computer, desktop computer, mobile device or another TV display at home. The user device 180 can be a laptop computer, desktop computer, mobile device or another TV display outside home.

Figure 25:
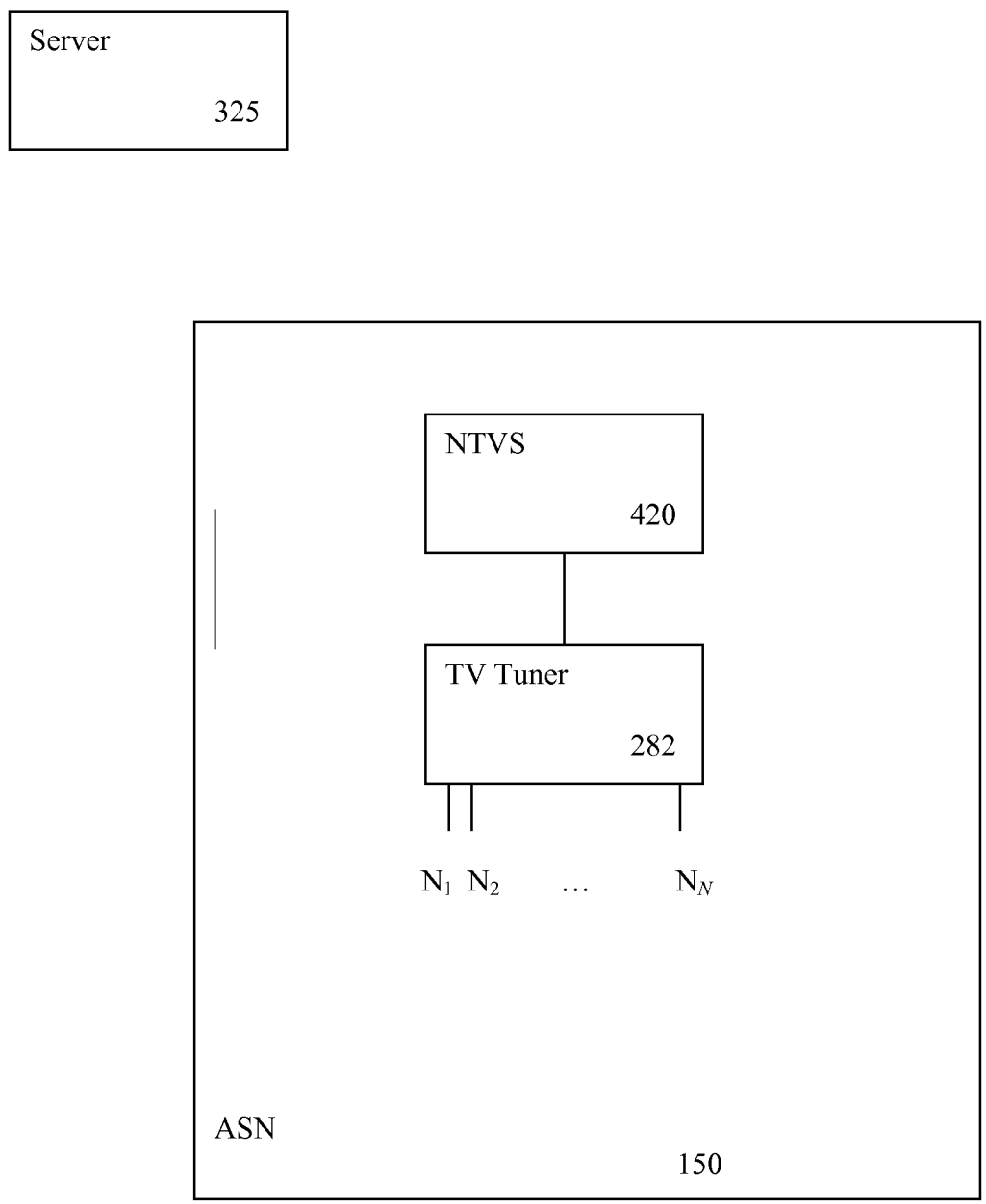
FIG. 25 is a block diagram showing the NTVS module.

FIG. 25 illustrates the mechanism underlying NTVS module 420 at a high level. NTVS module 420 provides store and forward functionality in real-time of the content being received by the recording tuners ($N_2, N_3 \ldots$) to registered user devices 180 that are actively also watching other channels. This is done regardless of whether these registered user devices 180 are within or outside of the home, and allows for the recording of the same content at the same time. This eliminates the limitation that prevents multiple channels from being watched at the same time. NTVS module 420 receives a request for a specific channel to be displayed. The NTVS module 420 checks the TV tuner 282 and determines if any of the available TV tuners are receiving the requested channel. If an active TV tuner is receiving the same TV channel as what was requested, then the NTVS module 420 stores the TV content in small blocks and sends those blocks to the streamer module 280 for transmission to the device that made the request. If the active TV tuner is not receiving the same channel then NTVS module 420 sends the request to a server 325 with the channel ID and the home ASN 150h ID; the server then looks for available visitor ASN(s) 150v based on which ASN(s) 150v are closest in proximity and checks if any of them are available and are receiving the same channel that was requested; the server locates one ASN 150v, which may already be receiving the channel or which is free to receive the channel from the video source, or a different video source; and the server provides the ASN 150v's NTVS module 420v with information from the NTVS module 420h of the requesting ASN 150h and enables handshaking between the two NTVS modules 420. If the NTVS module 420h of the requesting ASN 150h only needs the TV channel stream and has bandwidth to perform the transcoding and transrating itself with TVT-E 260h, then the NTVS module 420v of the ASN 150v starts streaming out the TV channel content that was requested to the NIC of the requesting ASN 150h and the NTVS module 420h of the requesting ASN 150h receives the TV channel from the visitor ASN 150v and sends the stream to the streamer module 280h for transcoding and transrating using TVT-E 260h based on the user devices 180 that will be accessing the content and based on the network used to send the original request to the NTVS 420h. If the NTVS module 420h of the requesting ASN 150h does not have the bandwidth to provide the transcoding and transrating functions, then it requests the NTVS module 420v on the visitor ASN 150v to do so. The request sent to the ASN 150v contains the format of the video stream that the NTVS module 420h of the requesting ASN 150h expects to receive. The NTVS module 420v of ASN 150v then transcodes the stream to the format requested by the NTVS module 420h of the requesting ASN 150h. The NTVS module 420h of the requesting ASN 150h receives the stream and passes it to the streamer module 280h for transrating to the device or devices that made the original content request based on user device 180 type and network the user device 180 used to connect to the requesting ASN 150h. Alternatively, server 325 is not required, and ASN 150h can broadcast a request for the content to which eligible ASNs will respond directly.

TV Channel Bundling Through Tuner Module

Conventionally, each TV tuner 282 monitors one frequency band at a time, which creates the limitation that one TV tuner can demux only one channel at a time; i.e., viewing one channel monopolizes one TV tuner. Tuner module 430, which may be in ASN 150 or a user device 180, addresses this problem by having all TV modules 430 monitor the same wide band signal, but filter the signal and extract from it the particular channels directed at user devices 180 through a code that distinguishes one channel from another and that is exchanged between the video source and tuner modules 430. Tuner module 430 receives all channels and also informs the ASN 150 of the code assigned to each channel. This means that each TV channel is scrambled with a specific code and that to view the TV channel of interest, the TV tuner 282 within ASN 150 relies on the specific code of the TV channel of interest to separate it from other channels. If TV tuner 282 has information concerning multiple codes, each belonging to a different TV channel, then one single TV tuner is capable of separating (demuxing) multiple TV channels transmitted within the same wide band signal. Therefore, codes assigned to each TV channel of interest are sent to TV tuner 282 and TV tuner 282 uses the codes to separate TV channels from the wide band signal and forward that to one or more user devices 180. Each demuxed channel can be sent to a different device, (e.g.: channel $N_1$ to user device$_1$ 180; channel $N_2$ to user device$_2$ 180 . . . channel N to user device$_N$ 180) or multiple demuxed channels can be sent to one single user device 180 (e.g. channels $N_1, N_2 \ldots N_N$ to user device$_1$ 180 or to multiple user devices 180 (e.g. channels $N_1, N_2, \ldots N_N$ to user device1 180 . . . channels $N_1, N_2 \ldots N_N$ to user device$_N$ 180).

To implement Tuner module 430 as described above, the TV tuner is able to monitor at least one wideband signal. The video source sends all video channels on frequencies that are a subset of this wideband signal. Each channel is scrambled according to its own scrambling code. Each time the TV tuner 282 requests a specific channel, the video source responds by providing the TV tuner 282 with the unscrambling code for the TV channel on the same bandwidth. The TV tuner 282 then uses this unscrambling code to separate, or demux, the specific TV channel of interest from the rest of the incoming TV channels. The TV tuner 282 is able to unscramble multiple TV channels simultaneously. This eliminates the need to have one TV tuner per TV channel.

Figure 26:
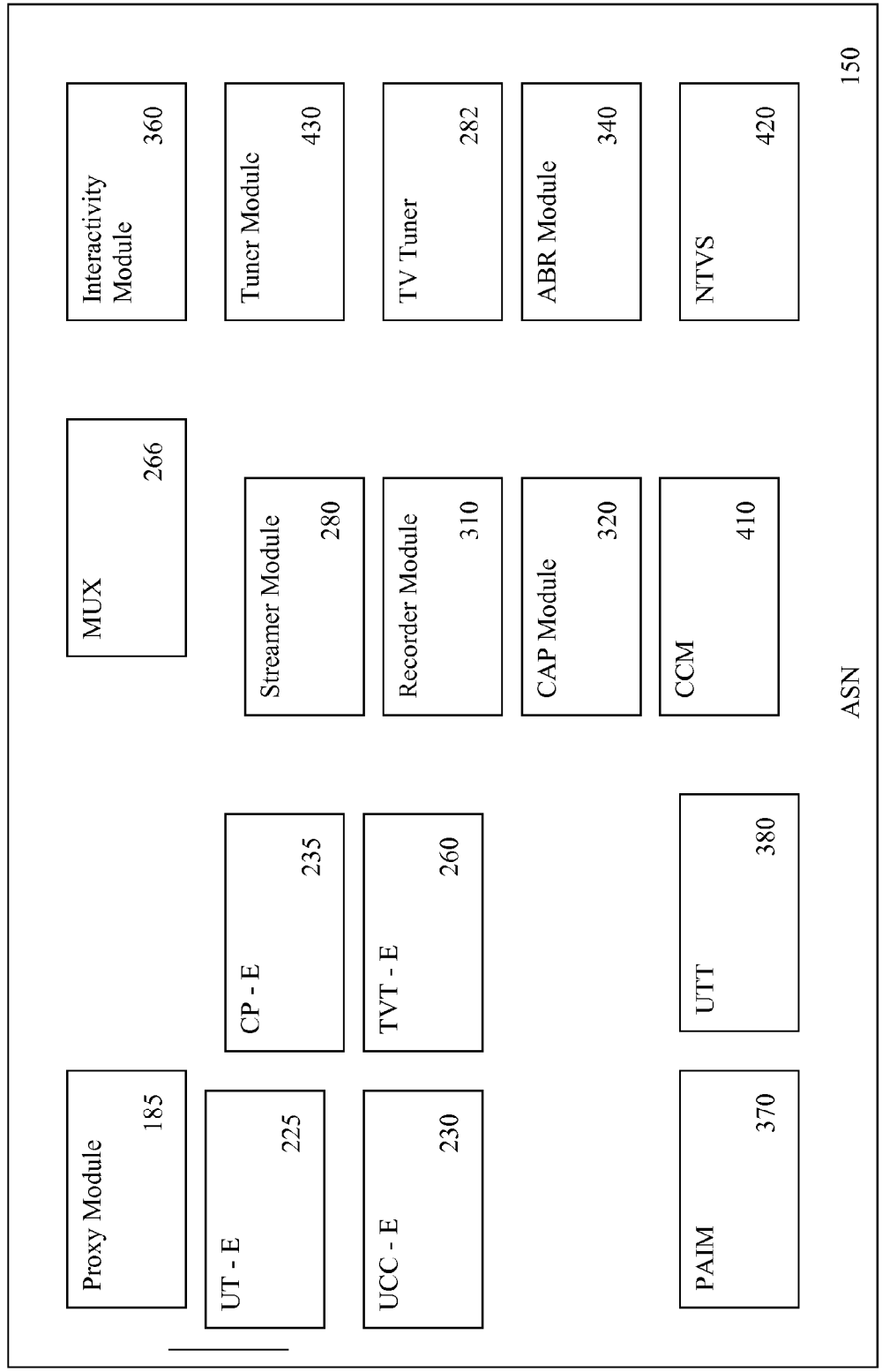
FIG. 26 is a block diagram of an ASN according to an embodiment of the present disclosure.

The foregoing software modules that the ASN 150 executes are managed by an applications manager 440 that executes on the ASN 150. FIG. 26 displays a block diagram of an ASN according to the present disclosure including key modules described herein.

Figure 27:
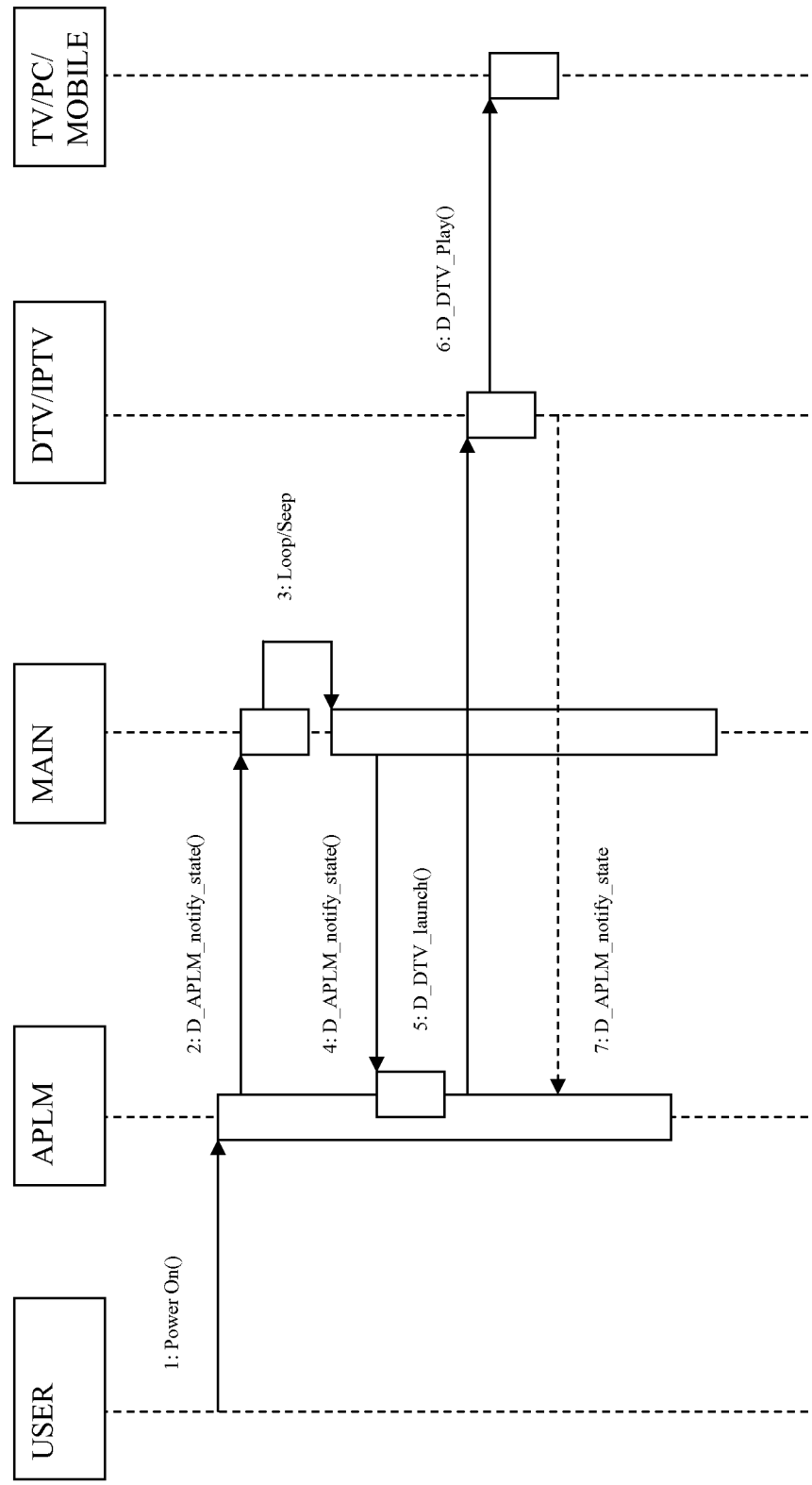
FIG. 27 is a state transition diagram for an application manager for power-on mode.
Figure 28:
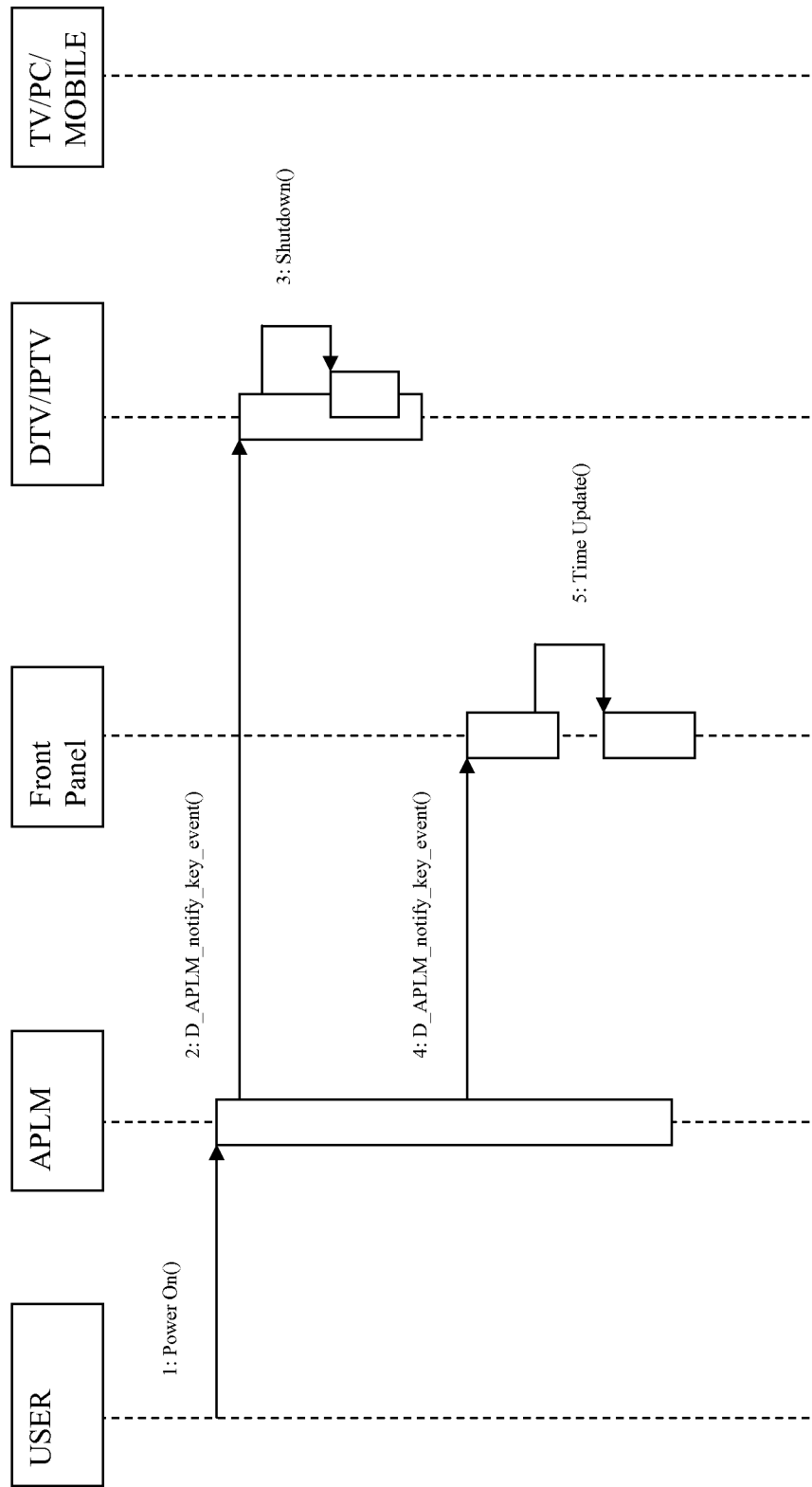
FIG. 28 is a state transition diagram for an application manager for power-off mode.
Figure 29:
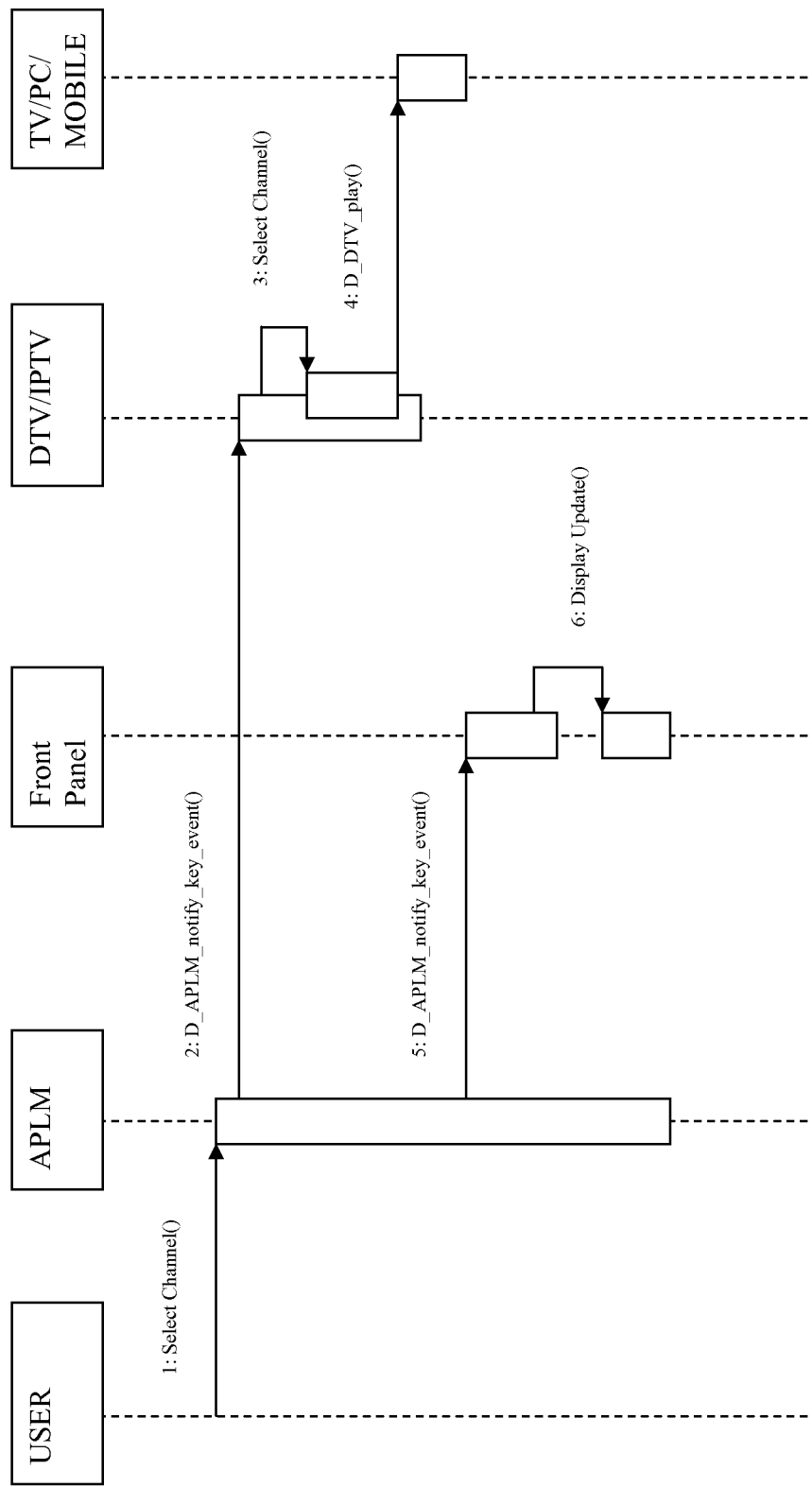
FIG. 29 is a state transition diagram for an application manager when a user changes the channel being viewed.

FIGS. 27 and 28 depict state transitions of the application manager 440 during while the ASN 150 is powered on and powered off, respectively. FIG. 19 is a state transition diagram of the application manager 440 when the user changes a channel being viewed. FIG. 9 depicts the various software layers that make up the software modules that the ASN executes.

For the sake of convenience, the embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed is:

1. A method of collecting information about usage patterns of a plurality of users and a plurality of user devices, comprising:

providing a server node, the plurality of user devices registered with said server node, each of said users registered with said server node, said server node located at a premises associated with said users, said server node configured to receive live television content, recorded, and Internet content via a network, and deliver said content to said plurality of user devices, the server node having a user characterization and history associated with each user, said server node providing content to said plurality of user devices via a plurality of network connection types;

determining, by the server node, for television content, when viewed by one of said users on one of said user devices, a channel watched, the program watched and a time the program was watched, and associating said channel, program and time with said user and said user device used to watch said content;

determining, by the server node, for recorded content, when viewed by one of said users on one of said user devices, a name of the recorded content, a number of times the recorded content was paused, a number of length of times the recorded content was fast forwarded, and a counter of the number of times the recorded content was watched;

determining, by the server node, for Internet content, when viewed by one of said users on one of said user devices, a URL of said Internet content, whether the URL was requested by said user or by a website, a classification of content of the URL, a classification of content at the URL selected by the user, a session start time and a session end time;

determining, by the server node, based on the user characterization of a user if a user session is typical or atypical of the user;

determining, by the server node, based on a comparison of changes in usage patterns of a plurality of users if a user session is based on a social variable; and updating, by the server node, the user history and user characterization associated with said user based on the determinations.

2. The method of claim 1 wherein said server node further determines and stores information about the type of network used to transmit said content to said user device.

3. The method of claim 1 wherein the updated user characterization is stored by said server node.

4. The method of claim 1 wherein said server node further identifies a network connection used to obtain said recorded content and determines the quality of the experience of the recorded content.

5. A system for collecting information about usage patterns of user sessions of a plurality of users and a plurality of user devices, comprising:

a server node, each of said users and user devices registered with said server node, said server node located at a premises of said users, said serving node configured to receive live television content, recorded content, and Internet content via a network, and deliver said content to said plurality of user devices, said server node having a user characterization and user history for each of said users;

wherein said server node is configured to determine, for television content, when viewed by one of said users on one of said user devices, a channel watched, the program watched and a time the program was watched, and associating said channel, program and time with said user and said user device used to watch said content;

wherein said server node is configured to determine, for recorded content, when viewed by one of said users on one of said user devices, a name of the recorded content, a number of times the recorded content was paused, a number of length of times the recorded content was fast forwarded, and a counter of the number of times the recorded content was watched;

wherein said server node is configured to determine, for Internet content, when viewed by one of said users on one of said user devices, a URL of said Internet content, whether the URL was requested by said user or by a website, a classification of content of the URL, a classification of content at the URL selected by the user, a session start time and a session end time;

wherein said server node is configured to determine, based on the user characterization of a user if a user session is typical or atypical of the user;

wherein said server node is configured to determine, based on a comparison of changes in usage patterns of a plurality of users if a user session is based on a social variable; and wherein said server node is configured to update the user history and user characterization based on said determinations.

6. The system of claim 5 wherein said server node is configured to determine and store information about the type of network used to transmit said content to said user device.

7. The system of claim 5 wherein said server node is configured to store the updated user characterization.

8. The system of claim 5 wherein said server node is configured to identify a network connection used to obtain said recorded content and determine the quality of the experience of the recorded content.

* * * * *